US007349577B2

(12) United States Patent
Kaneda et al.

(10) Patent No.: US 7,349,577 B2
(45) Date of Patent: Mar. 25, 2008

(54) IMAGE PROCESSING METHOD AND IMAGE PROCESSING SYSTEM

(75) Inventors: Kitahiro Kaneda, Kanagawa (JP); Hiroshi Tanioka, Kanagawa (JP); Akihiro Usami, Kanagawa (JP); Ken-ichi Ohta, Kanagawa (JP); Hirohiko Ito, Kanagawa (JP); Shinichi Kato, Kanagawa (JP); Tomohiro Akiba, Yokyo (JP); Tomotoshi Kanatsu, Tokyo (JP); Reiji Misawa, Tokyo (JP); Yoshihide Terao, Kanagawa (JP); Mitsuru Uzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 10/781,869

(22) Filed: Feb. 20, 2004

(65) Prior Publication Data
US 2004/0247206 A1 Dec. 9, 2004

(30) Foreign Application Priority Data
Feb. 21, 2003 (JP) .............................. 2003-044299

(51) Int. Cl.
*G06K 9/46* (2006.01)
(52) U.S. Cl. .................... 382/190; 358/1.17; 358/1.18; 382/305; 707/3; 707/6
(58) Field of Classification Search .............. 358/1.13, 358/1.15, 1.18, 1.17; 382/190, 197, 305, 382/310; 715/520; 707/3, 6, 104.1
See application file for complete search history.

(56) References Cited

U.S. PATENT DOCUMENTS 5,486,686 A 1/1996 Zdybel, Jr. et al. ......... 235/375
5,761,328 A * 6/1998 Solberg et al. .............. 382/113
5,926,824 A 7/1999 Hashimoto .................. 707/520
5,983,237 A * 11/1999 Jain et al. ................ 707/104.1
6,134,338 A * 10/2000 Solberg et al. .............. 382/113

(Continued)

FOREIGN PATENT DOCUMENTS

EP 0 751 672 1/1997

(Continued)

OTHER PUBLICATIONS

David Doermann, "The Indexing and Retrieval of Document Images: A Survey", Computer Vision and Image Understanding, vol. 70, No. 3, Article No. IV9800692, 287-298 (Jun. 1998).

*Primary Examiner*—Gregory M Desire
(74) *Attorney, Agent, or Firm*—Fitzpatrick, Cella, Harper & Scinto

(57) ABSTRACT

This invention provides an image processing method which allows easy re-use of image information that is stored to minimize deterioration of image quality and the storage capacity. Storage means is searched for original digital data corresponding to each input image. If no original digital data is found, the input image is converted into vector data, and is stored as digital data in the storage means. A sheet including at least one of information associated with the found original digital data when the original digital data is found in the search step and information associated with digital data which is obtained by converting the image into the vector data in the vectorization step and is stored in the storage step when no original digital data is found in the search step is generated, thus providing a sheet that allows easy re-use.

16 Claims, 24 Drawing Sheets

U.S. PATENT DOCUMENTS

| | | | |
|---|---|---|---|
| 6,466,329 B1 | 10/2002 | Mukai | 358/1.15 |
| 6,669,316 B2* | 12/2003 | Cantwell | 347/3 |
| 6,711,998 B2* | 3/2004 | Hashimoto | 101/129 |
| 6,782,144 B2* | 8/2004 | Bellavita et al. | 382/310 |
| 7,194,140 B2* | 3/2007 | Ito et al. | 382/251 |
| 2004/0218836 A1* | 11/2004 | Kanatsu | 382/305 |
| 2004/0223197 A1* | 11/2004 | Ohta et al. | 358/538 |
| 2004/0247206 A1* | 12/2004 | Kaneda et al. | 382/305 |
| 2006/0008113 A1* | 1/2006 | Matsukubo et al. | 382/100 |
| 2006/0008114 A1* | 1/2006 | Sekiguchi et al. | 382/100 |
| 2006/0010115 A1* | 1/2006 | Yoshida et al. | 707/3 |
| 2006/0010116 A1* | 1/2006 | Yaguchi et al. | 707/3 |
| 2006/0045386 A1* | 3/2006 | Fukuoka et al. | 382/305 |
| 2006/0047732 A1* | 3/2006 | Kudo | 707/205 |
| 2006/0114485 A1* | 6/2006 | Sato | 358/1.13 |
| 2006/0210162 A1* | 9/2006 | Sato | 382/176 |
| 2006/0221357 A1* | 10/2006 | Uzawa | 358/1.1 |

FOREIGN PATENT DOCUMENTS

| | | |
|---|---|---|
| EP | 1 256 900 | 11/2002 |
| JP | 8-147445 | 6/1996 |
| JP | 10-285378 | 10/1998 |
| JP | 2001-358863 | 12/2001 |

* cited by examiner

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY   1 : text   2 : picture   3 : table   4 : line   5 : photo

INPUT FILE INFORMATION

| TOTAL NUMBER OF BLOCKS | N ( =6 ) |
|---|---|

IMAGE PROCESSING METHOD AND IMAGE PROCESSING SYSTEM

FIELD OF THE INVENTION

The present invention relates to an image processing method and image processing system, which converts image data scanned by an image processing apparatus such as a copying machine or the like into vector data that can be re-used by so-called document creation application software (e.g., Word or the like).

BACKGROUND OF THE INVENTION

In recent years, amid calls for environmental issues, moves towards paperless offices have been promoted, and various techniques that handle digital documents have been proposed.

For example, patent reference 1 (Japanese Patent Laid-Open No. 2001-358863) describes a technique for scanning a paper document by a scanner, converting the scanned data into a digital document format (e.g., JPEG, PDF, or the like), and storing the converted data in image storage means.

Patent reference 2 (Japanese Patent Laid-Open No. 8-147445) discloses a document management system which detects regions of respective properties contained in a document image, and manages the document as contents for respective regions.

Furthermore, patent reference 3 (Japanese Patent Laid-Open No. 10-285378) discloses the following technique. That is, in a digital multi-function peripheral (MFP) (comprising a copy function, scan function, print function, and the like), it is confirmed if a scanned image includes a graphic code indicating a page ID, and if the graphic code is found, a database is searched for the corresponding page ID. If the page ID is found in the database, the currently scanned image is discarded, print data associated with that page ID is read out, and a print image is generated and is printed on a paper sheet by a print operation. On the other hand, if no corresponding page ID is found in the database, the scanned image is directly copied onto a paper sheet in a copy mode, or a PDL command is appended to the scanned image to convert the scanned image into a PDL format, and the converted data is transmitted in a facsimile or filing mode.

With the technique of patent reference 1, an image scanned by the scanner can be saved as a JPEG file or PDF file with a compact information size. However, this technique cannot search for a saved file based on the printed document. Hence, when print and scan processes are repeated, the saved digital document image gradually deteriorates.

The technique of patent reference 2 divides an image into a plurality of regions and allows these regions to be re-usable for respective contents. However, the contents are searched on the basis of a user's instruction, and contents to be used are determined from the found contents. Hence, upon generating a document using the stored contents, the user must determine contents to be used, thus taking a lot of trouble.

With the technique of patent reference 3, if no original digital document corresponding to a paper document is found, a PDL command is appended to a scanned image to convert that image into a PDL format. However, when the PDL command is merely appended to the scanned image to convert that image into the PDL format, a relatively large file size is required.

SUMMARY OF THE INVENTION

The present invention has been proposed to solve the conventional problems, and has as its objects to provide an image processing method and image processing system, which allow the user to easily re-use digital data stored in storage means using a portal sheet of an input image.

In order to achieve the above object, an image processing method according to the present invention comprises a search step of searching storage means for original digital data corresponding to each input image, a vectorization step of converting the input image into vector data when no original digital data is found in the search step, a storage step of storing the image that has been converted into the vector data in the vectorization step in the storage means as digital data and a sheet generation step of generating a sheet including at least one of information associated with the found original digital data when the original digital data is found in the search step and information associated with digital data which is obtained by converting the image into the vector data in the vectorization step and is stored in the storage step when no original digital data is found in the search step.

In order to achieve the above object, an image processing system according to the present invention comprises search means for searching storage means for original digital data corresponding to each input image, vectorization means for converting the input image into vector data when no original digital data is found by the search means, save means for storing the image that has been converted into the vector data by the vectorization means in the storage means as digital data and sheet generation means for generating a sheet including at least one of information associated with the found original digital data when the original digital data is found by the search means and information associated with digital data which is obtained by converting the image into the vector data by the vectorization means and is stored by the save means when no original digital data is found by the search means.

Further objects, features and advantages of the present invention will become apparent from the following detailed description of embodiments of the present invention with reference to the accompanying drawings.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5 shows an example of the configurations of block information and input file information;

DETAILED DESCRIPTION OF THE PREFERRED EMBODIMENTS

Figure 1:
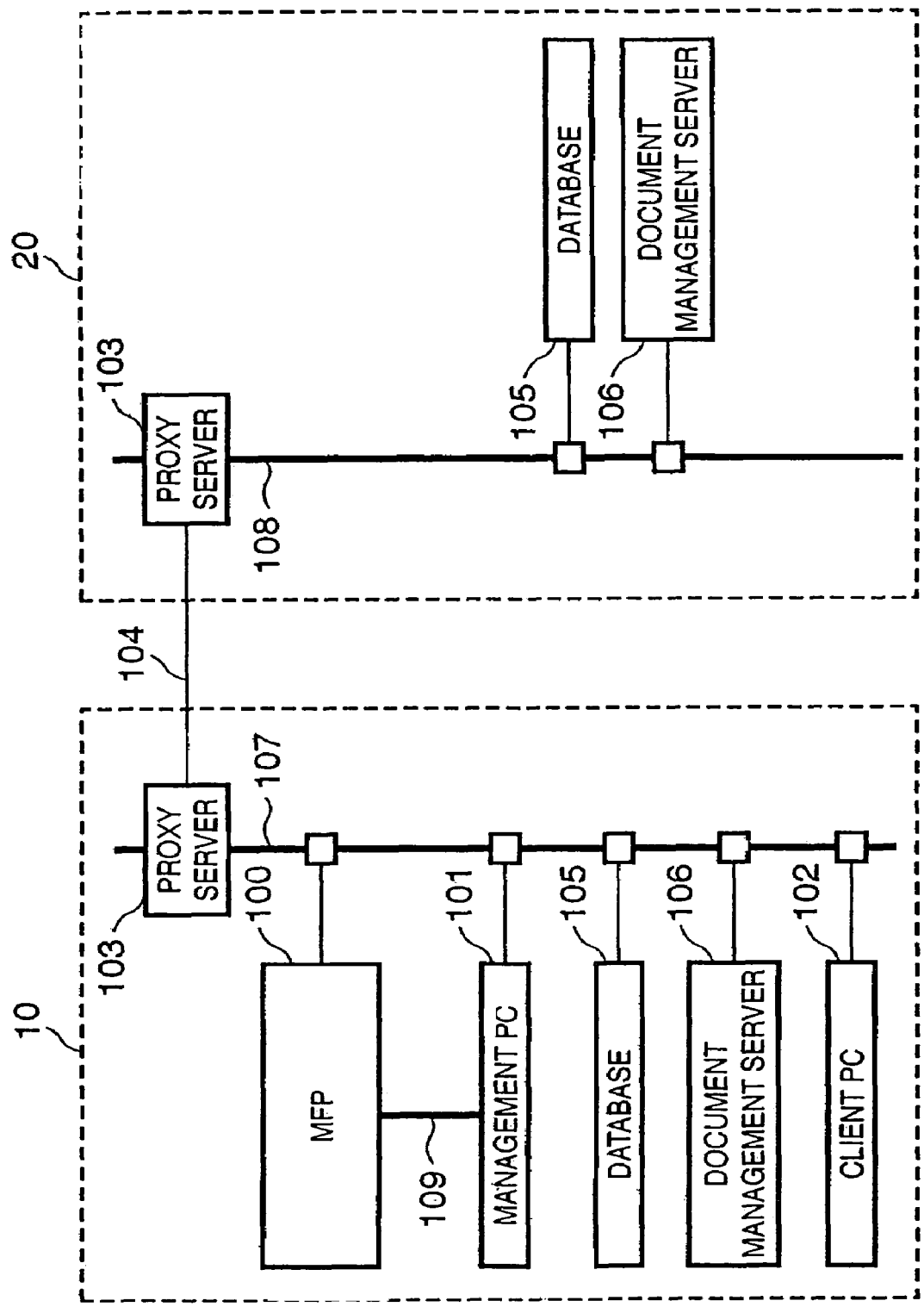
FIG. 1 is a block diagram showing an example of the arrangement of an image processing system.

An embodiment of the present invention will be described hereinafter. FIG. 1 is a block diagram showing an example of the arrangement of an image processing system according to the present invention. This image processing system is implemented in an environment in which offices 10 and 20 are connected via an Internet 104. To a LAN 107 formed in the office 10, an MFP (Multi-Function Peripheral) 100, a management PC 101 for controlling the MFP 100, a client PC 102, a document management server 106, its database 105, and a proxy server 103 are connected. The LAN 107 and a LAN 108 in the office 20 are connected to the Internet 104 via the proxy servers 103. The MFP 100 has charge of an image scanning process (scanner) of paper documents and some of image processes for a scanned image signal in the present invention, and supplies an image signal to the management PC 101 via a LAN 109. The management PC comprises a general PC, which has image storage means, image processing means, display means, input means, and the like, but some means of which are integrally formed with the MFP 100.

Figure 2:
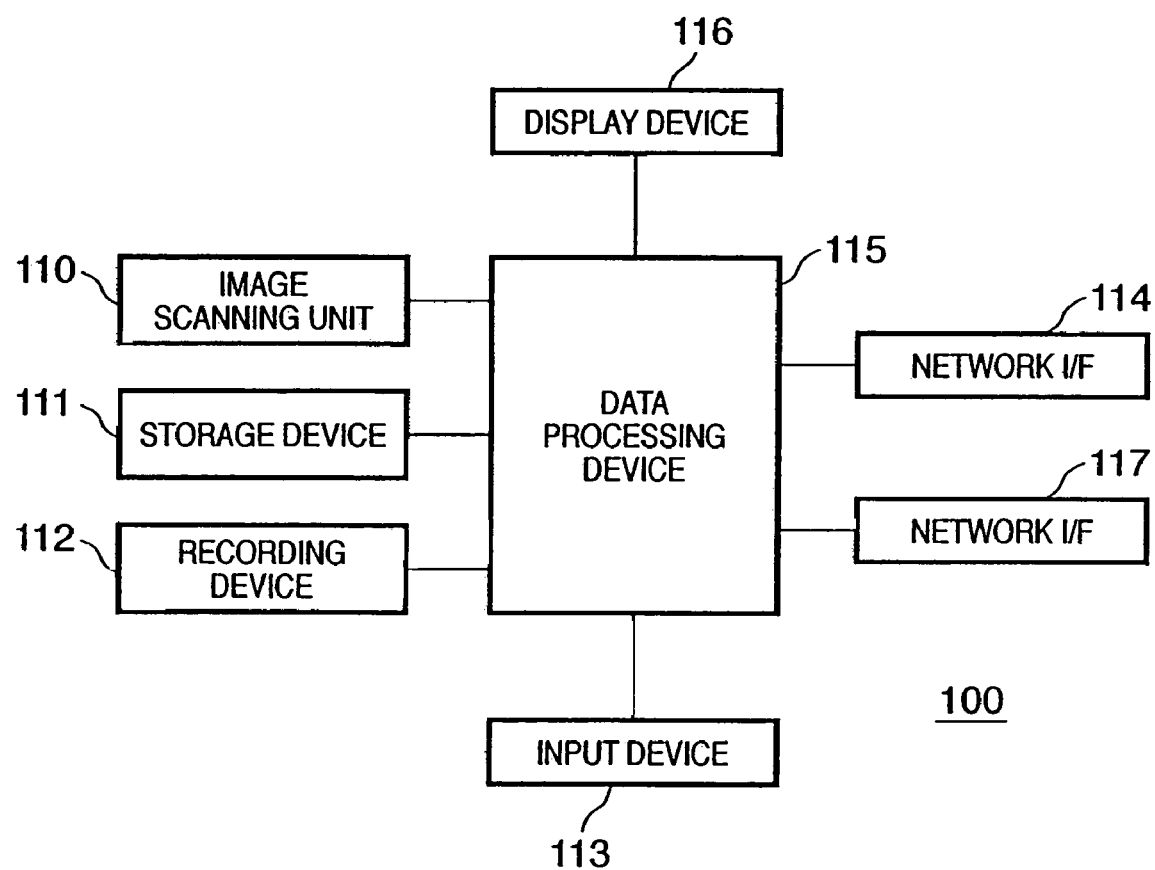
FIG. 2 is a block diagram showing an example of the arrangement of an MFP.

FIG. 2 is a block diagram showing the arrangement of the MFP 100. Referring to FIG. 2, an image scanning unit 110 including an auto document feeder (to be abbreviated as an ADF hereinafter) irradiates a document image on each of one or a plurality of stacked documents with light coming from a light source (not shown), forms an image of light reflected by the document on a solid-state image sensing element via a lens, and obtains a scanned image signal in the raster order as image information at a resolution of, for example, 600 DPI, from the solid-state image sensing element. In a normal copy function, a data processing device 115 executes an image process of that image signal to convert it into a recording signal. In case of a multi-copy process, the data processing device 115 temporarily stores recording data in a storage device 111, and sequentially outputs that data to a recording device 112, thus forming images on paper sheets.

Print data output from the client PC 102 is received by the data processing device 115 via the LAN 107 and a network I/F 114, and is then converted into recordable raster data by the data processing device 115. The raster data is then input to the recording device to form a recording image on a paper sheet.

The operator inputs instructions to the MFP using a key console equipped on the MFP, and an input device 113 which includes a keyboard and mouse whose outputs are to be input to the management PC. Such series of operations are controlled by a controller (not shown) in the data processing device 115.

A display device 116 displays status of operation inputs and image data whose process is underway. Note that the storage device 111 is also controlled from the management PC, and data exchange and control between these MFP and management PC are done via a network I/F 117 and the directly connected LAN 109.

Note that the present invention is practiced in the apparatus shown in FIG. 2 or the system shown in FIG. 1. For example, the processes of the present invention (to be described later) may be implemented when a controller (CPU) of the data processing device 115 executes a computer executable control program stored in the storage device 111 in FIG. 2 (in this case, the control program that forms the present invention may be stored in the storage device 111 or may be loaded and executed from an external device via a communication line or the like; the storage device is not limited to a built-in hard disk but may be a removable disk or the like). Also, the process of the present invention may be implemented by an electrical circuit as hardware components which include all or some components of the controller of the data processing device 115.

<<Overview of Process>>

An overview of the entire image process according to the present invention will be described below using FIG. 3.

Figure 3:
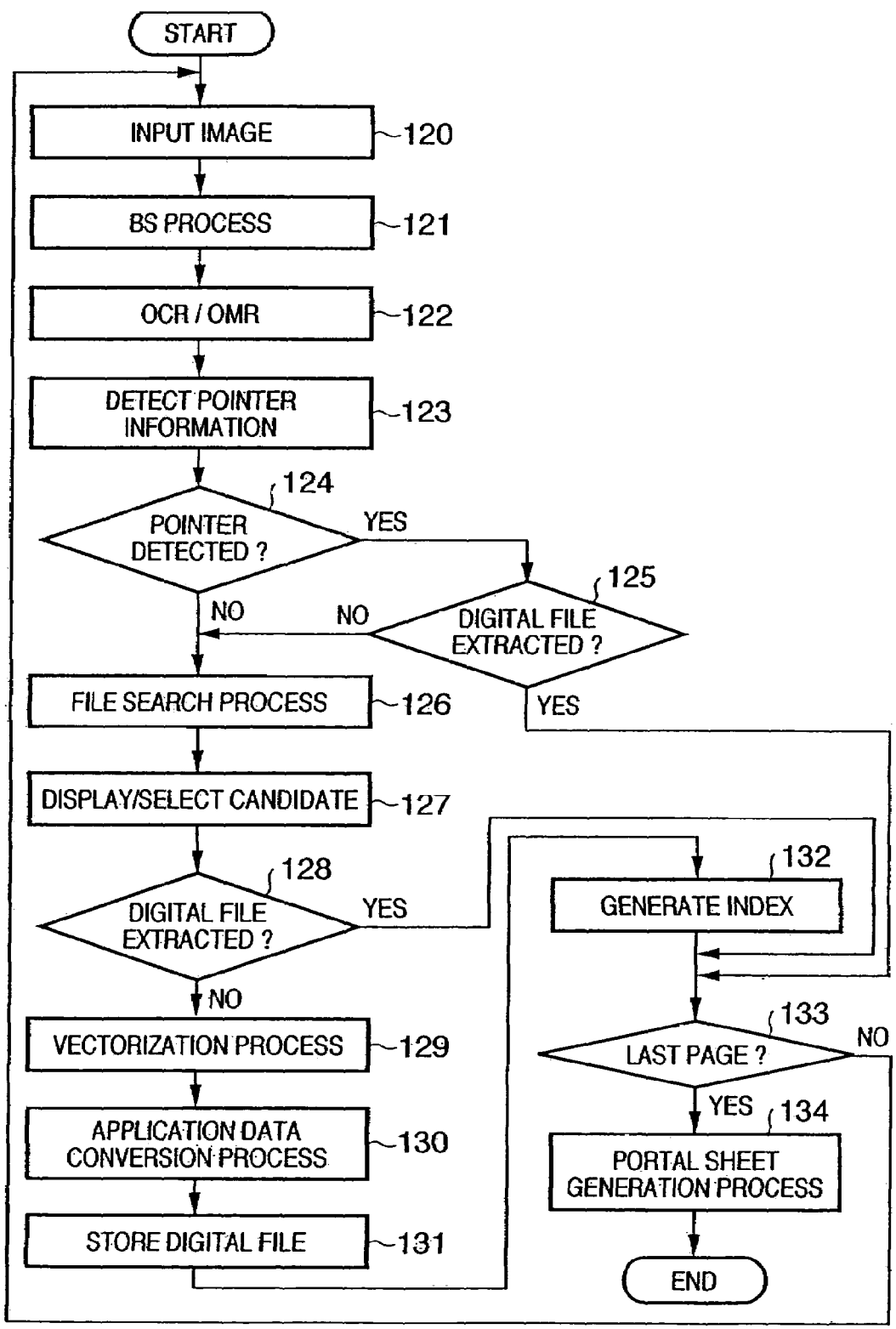
FIG. 3 is a flow chart showing an overview of the entire operation of an image process.

Referring to FIG. 3, the image scanning unit 110 of the MFP 100 is enabled to scan one document in a raster order, and to obtain an 8-bit image signal of a 600 DPI in an image information input process 120. This image signal undergoes a pre-process by the data processing device 115, and is stored as image data for one page in the storage device 111. A CPU of the management PC 101 separates regions of a text/line image part and halftone image part from the stored image signal. The CPU further separates a text part into blocks combined as clusters for respective paragraphs, and a line image part into tables and graphics formed of lines, and converts these tables and graphics into segments. On the other hand, the CPU segments an image part expressed by halftone into independent objects for respective so-called blocks (e.g., a rectangular image part block, background part block, and the like) (step 121).

At this time, an object corresponding to a two-dimensional barcode or URL, which is recorded in the document image as additional information, is detected. In this case, the URL undergoes a character recognition process (OCR) or a corresponding mark of the two-dimensional barcode is decoded (OMR) (step 122), thereby detecting pointer information in the storage device that stores an original digital file of that document (step 123). As a method of appending the pointer information, a method of embedding information by slightly changing the spacings between neighboring characters, a method of embedding information in a halftone image as a digital watermark, or the like may be adopted.

If the pointer information is detected, the flow branches to step 125 to search for an original digital file from the address designated by the pointer. The digital file is stored in one of a hard disk in the client PC, the database 105 managed by the document management server 106 connected to the LAN in the office 10 or 20, and the storage device 111 of the MFP 100 itself in FIG. 1, and these storage devices are searched in accordance with the address information obtained in step 123. If no digital file is found or if the found file is a so-called image file represented by JPEG, PDF, or tiff in step 125, or if the pointer information itself is not found in step 124, the flow branches to step 126. If the digital file is found based on the pointer information in step 125, the flow branches to step 133.

Step 126 is a so-called document search process routine. A full-text search is conducted by extracting words from the results of the OCR process which is executed for text blocks in step 122, and comparing them with words contained in a digital file, or a so-called layout search is conducted by comparing the layout and properties of respective objects with those of a digital file. As a result of the search process, if digital files with high similarity levels are found, digital files as candidates are displayed as thumbnails or the like (step 127), and a file is specified from the plurality of candidates by an operator's input operation if necessary. If a digital file is specified, the flow jumps to step 133; if no digital file is found by the search process in step 126 or if the specified digital file is a so-called image file represented by PDF, tiff, or the like, the flow branches to step 129.

Step 129 is a conversion process step from image data into vector data, and converts image information into a vectorized digital file. For text blocks that have undergone the OCR process in step 122, the size, style, and font of characters are further recognized to convert the text blocks into font data which are visually faithful to characters obtained by scanning the document. Also, table and graphic blocks formed of lines are converted into outline data. Natural image blocks such as a photo or the like are processed as an independent JPEG file as image data. Such vectorization processes are executed for respective objects, and layout information of the objects is saved. In step 130, these objects and layout information are converted into application data which can be edited by a general application. In step 131, the application data is stored in the storage device 111 as a digital file. Furthermore, in order to allow a direct search process of that digital file upon executing a similar process, index information for such search process is generated and is added to a search index file in step 132. Note that the data may be converted into an rtf (Rich Text Format) file that as a versatile file format in step 130. Note that the application data file to be converted is not limited to the rtf format that allows object embedding. For example, data may be converted into other file formats such as an SVG (Scalable Vector Graphics) format and the like.

Upon completion of the aforementioned processes, it is checked in step 133 if the page of interest is the last page. If No instep 133, the control returns to step 120 to repeat the processes for the next page.

If the page of interest is the last page, the control advances to step 134.

Step 134 is a process as a characteristic feature of the present invention. That is, in step 134 an index sheet (also referred to as a portal sheet) which contains page information (e.g., thumbnail, title, abstract, keywords, ID, date, author, pointer information to processing results, and the like) of all pages specified via the above scan, search, and vectorization processes is generated and output.

<<Block Selection Process>>

The block selection process in step 121 will be described first.

Figure 4:
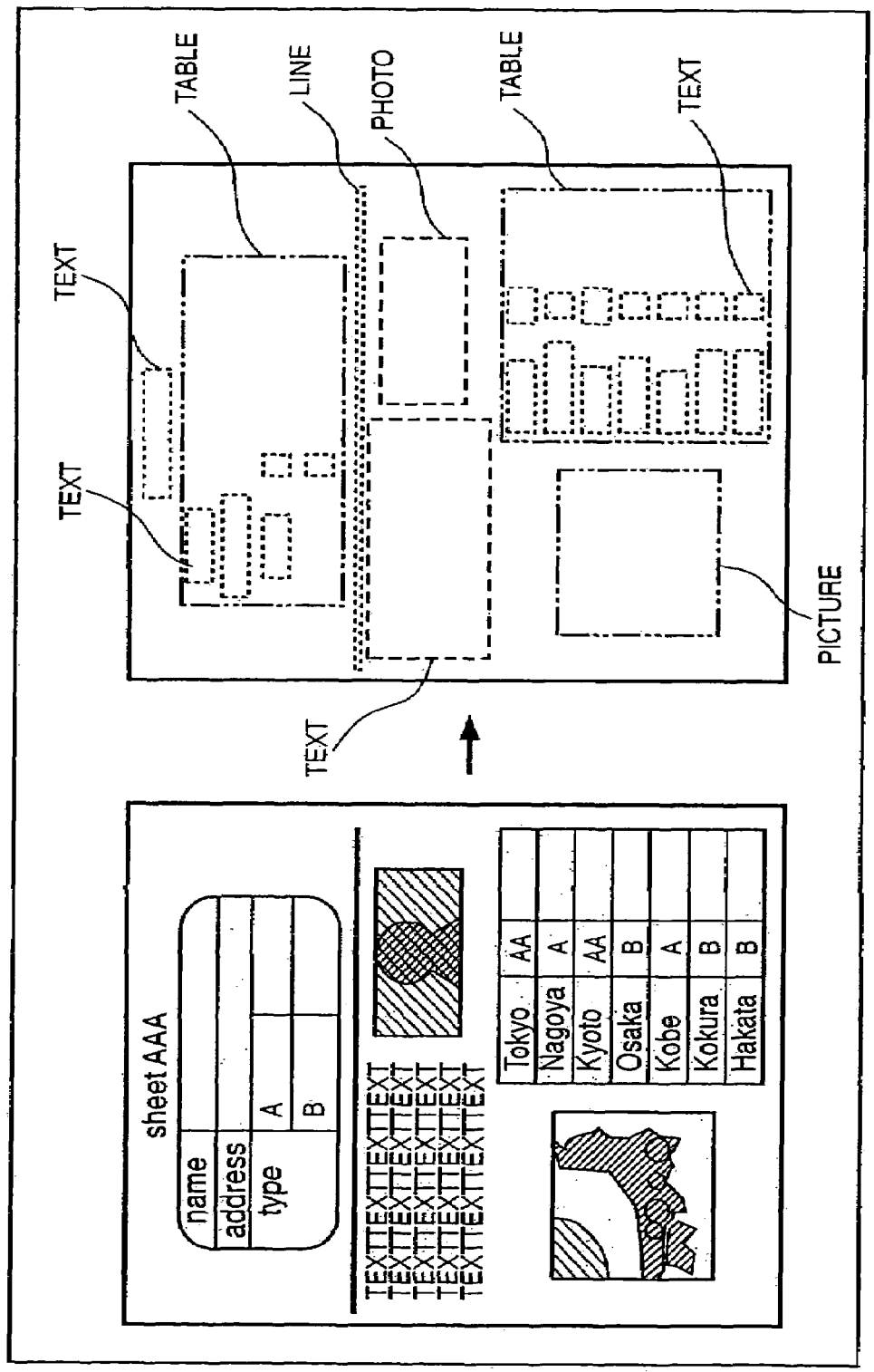
FIG. 4 shows an example of a block selection process.

In the block selection process, image data input in step 120 (left side of FIG. 4) is recognized as clusters for respective objects, properties (text/picture/photo/line/table, etc.) of respective blocks are determined, and the image data is segmented into regions having different properties, as shown in the right side of FIG. 4.

One embodiment of the block selection process will be described below.

An input image is binarized to a monochrome image, and a cluster of pixels bounded by an outline of black pixels is extracted by outline tracing of black pixels. For a cluster of black pixels with a large area, outline tracing is also made for white pixels in the cluster to extract clusters of white pixels. Furthermore, a cluster of black pixels is recursively extracted from the cluster of white pixels with a predetermined area or more.

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a low-profile pixel cluster is categorized as a line region, a range occupied by black pixel clusters that include rectangular white pixel clusters which have a predetermined size or more and regularly line up is categorized as a table region, a region where pixel clusters with indeterminate forms are distributed is categorized as a photo region, and other pixel clusters with an arbitrary shape is categorized as a picture region, and so forth.

FIG. 5 shows block information for respective blocks obtained by the block selection process, and input file information used to manage blocks included in an input image. These pieces of information for respective blocks are used to execute vectorization or to conduct a search, as will be described later.

<<Detection of Pointer Information>>

The OCR/OMR process (step 122) for extracting the storage location of a file from image information will be described below.

Figure 6:
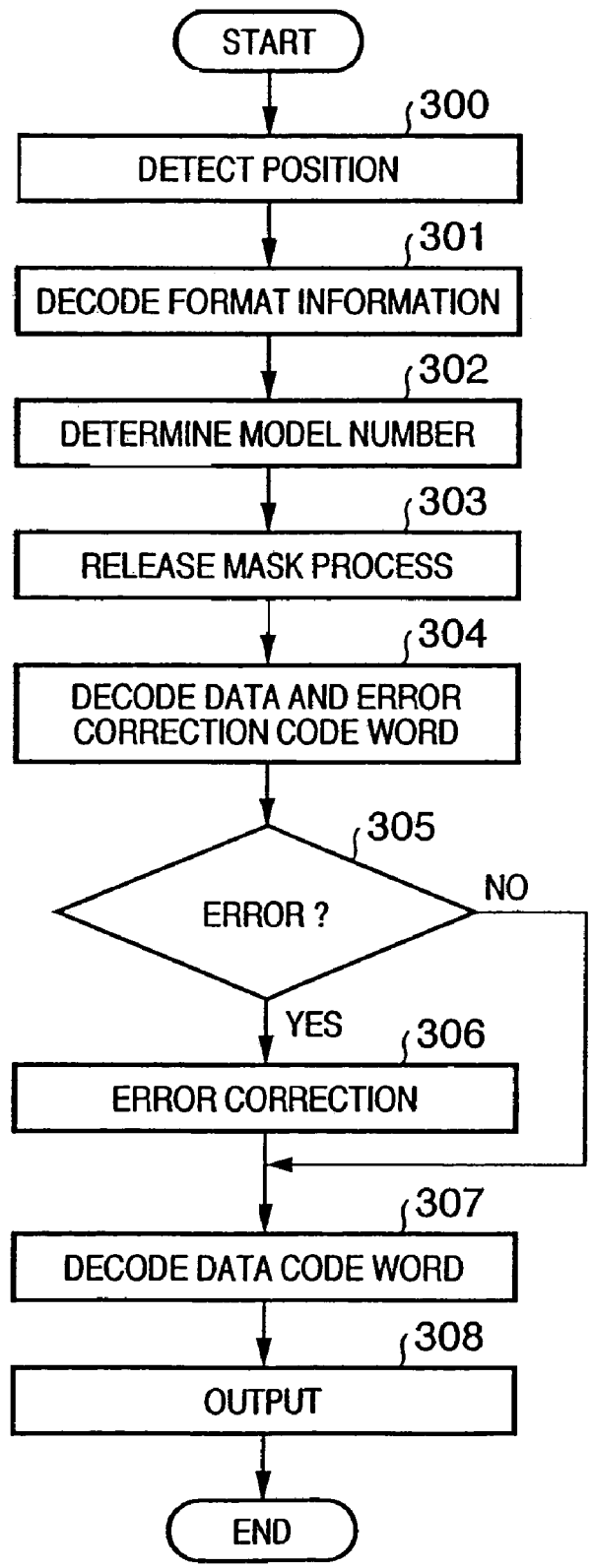
FIG. 6 is a flow chart showing a decoding process of a two-dimensional barcode.
Figure 7:
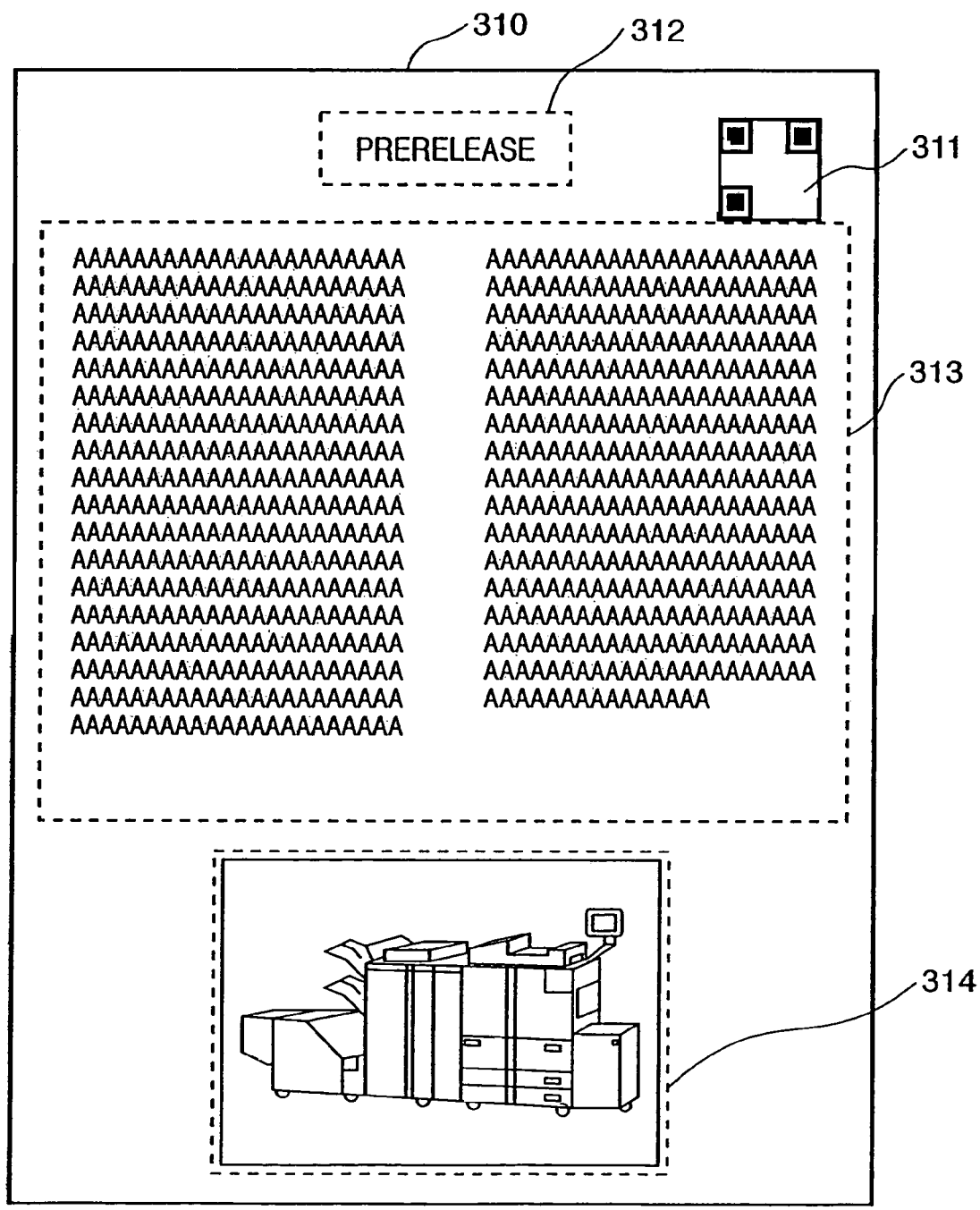
FIG. 7 shows an example of a document appended with a two-dimensional barcode.

FIG. 6 is a flow chart showing a sequence for decoding a two-dimensional barcode (QR code symbol) appended into a document image, and outputting a data character string. FIG. 7 shows an example of a document 310 appended with a two-dimensional barcode.

A CPU (not shown) scans an image that represents the document 310 stored in a page memory in the data processing device 115 to detect the position of a predetermined two-dimensional barcode symbol 311 from the result of the aforementioned block selection process. A position detection pattern of a QR code is made up of identical position detection element patterns, which are located at three out of four corners of the symbol (step 300).

Next, format information that neighbors the position detection pattern is decoded to obtain an error correction level and mask pattern applied to the symbol (step 301).

After a model number of the symbol is determined (step 302), an encoded region bit pattern is XORed using the mask pattern obtained from the format information to release the mask process (step 303).

Note that a symbol character is read in accordance with the layout rule corresponding to the model so as to decode message data and an error correction code word. (step 304).

It is detected if a decoded code includes an error (step 305). If any error is detected, the flow branches to step 306 to correct that error.

A data code word is divided into segments on the basis of a mode indicator and character count indicator from the error-corrected data (step 307).

Finally, data characters are decoded on the basis of a specification mode, thus outputting the result (step 308).

Note that data to be encoded in the two-dimensional barcode represents address information of the corresponding file, which is formed of path information including a file server name and file name. Conversely, the address information may be formed of a URL to the corresponding file.

In this embodiment, the document 310 appended with the pointer information using the two-dimensional barcode has been described. Alternatively, pointer information may be recorded using a character string. In this case, a block of a character string according to a predetermined rule (e.g., a text block located at a predetermined position) is detected by the above block selection process, and characters of the character string block that indicates the pointer information undergo character recognition, thus obtaining the address information of the original file.

Furthermore, pointer information can also be assigned by embedding information in the character spacings by applying imperceptible modulation to, for example, the spacings between neighboring characters in a character string of a text block 312 or 313 of the document 310 shown in FIG. 7. For example, when the character spacings are detected upon executing a character recognition process (to be described later), pointer information can be obtained. Also, pointer information can be assigned as an invisible digital watermark in a natural image 314.

<<File Search Based on Pointer Information>>

Figure 8:
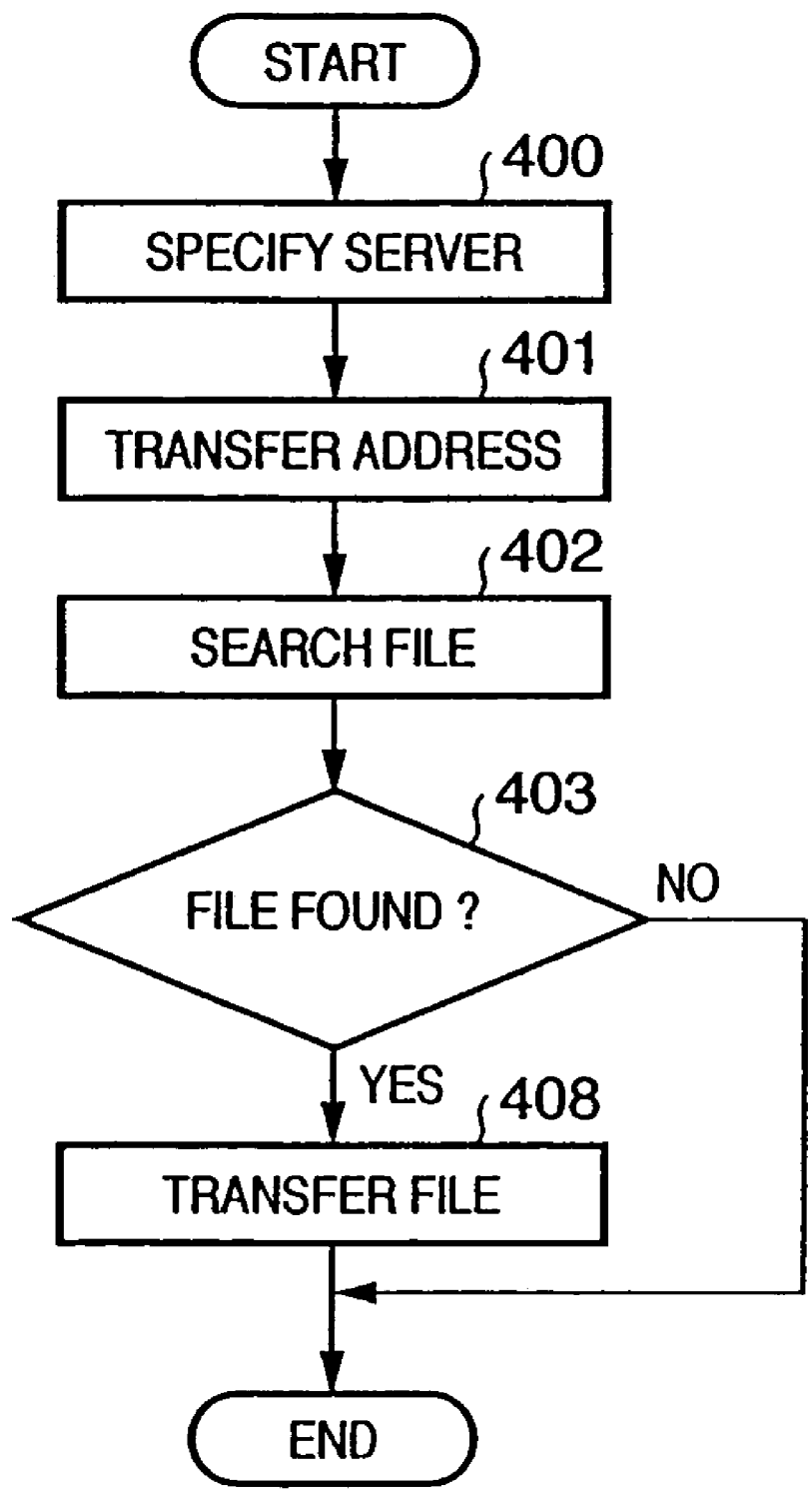
FIG. 8 is a flow chart of a file search process based on pointer information.

The digital file search process based on the pointer information in step 125 in FIG. 3 will be described below using the flow chart of FIG. 8.

A file server is specified based on an address included in the pointer information (step 400).

Note that the file server indicates the client PC 102, the document management server 106 that incorporates the database 105, or the MFP 100 itself that incorporates the storage device 111. Also, the address is a URL or path information including a server name and file name.

After the file server can be specified, the address is transferred to the file server (step 401). Upon reception of the address, the file server searches for a corresponding file (step 402). If no file is found (No in step 403), the file server sends a message that advises accordingly to the MFP.

On the other hand, if a file is found (Yes in step 403), the file address is notified, and is used in the process in step 134 (step 408).

<<File Search Process>>

Figure 10A:
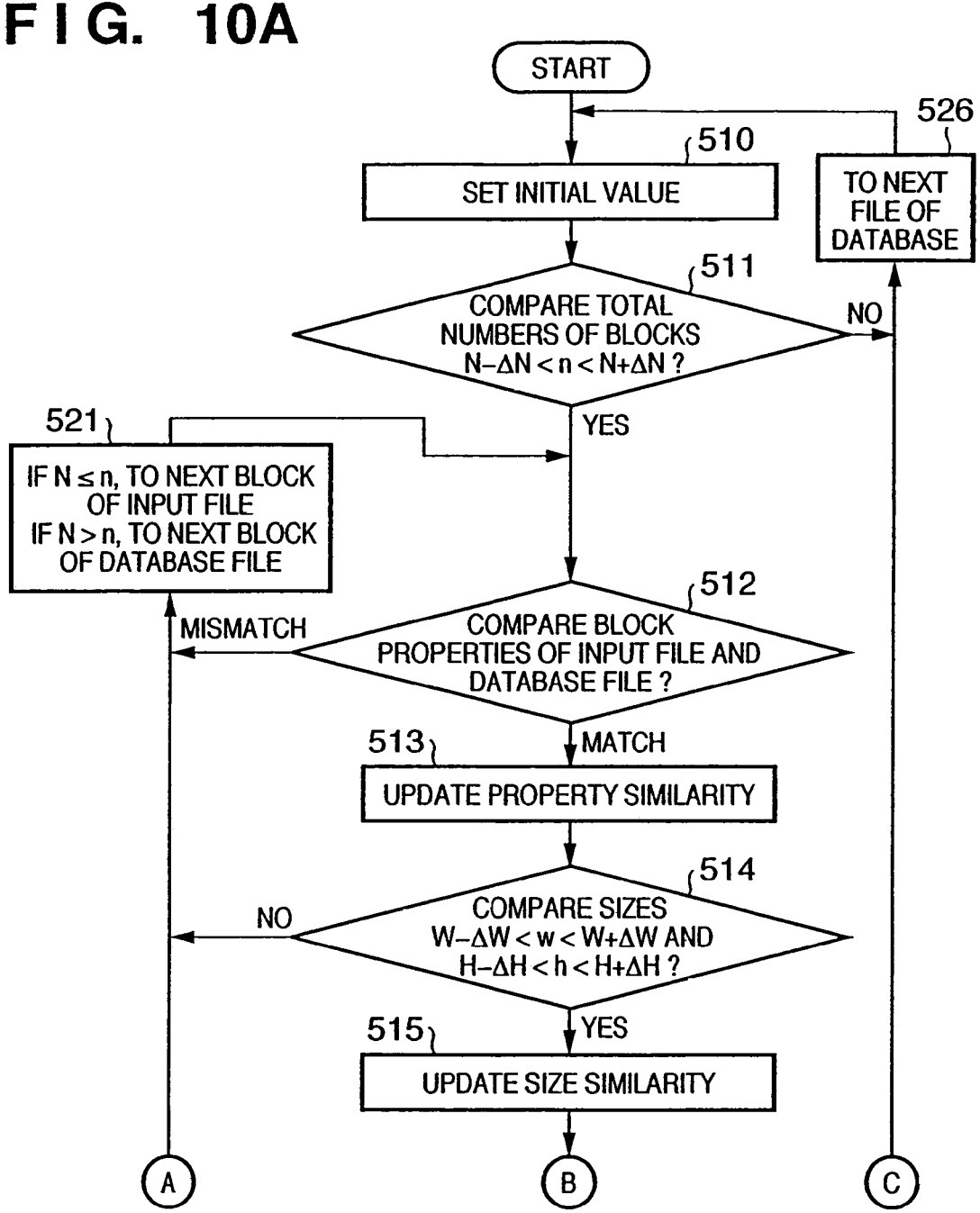
FIGS. 10A and 10B are flow charts showing a layout search process of a file.
Figure 10B:
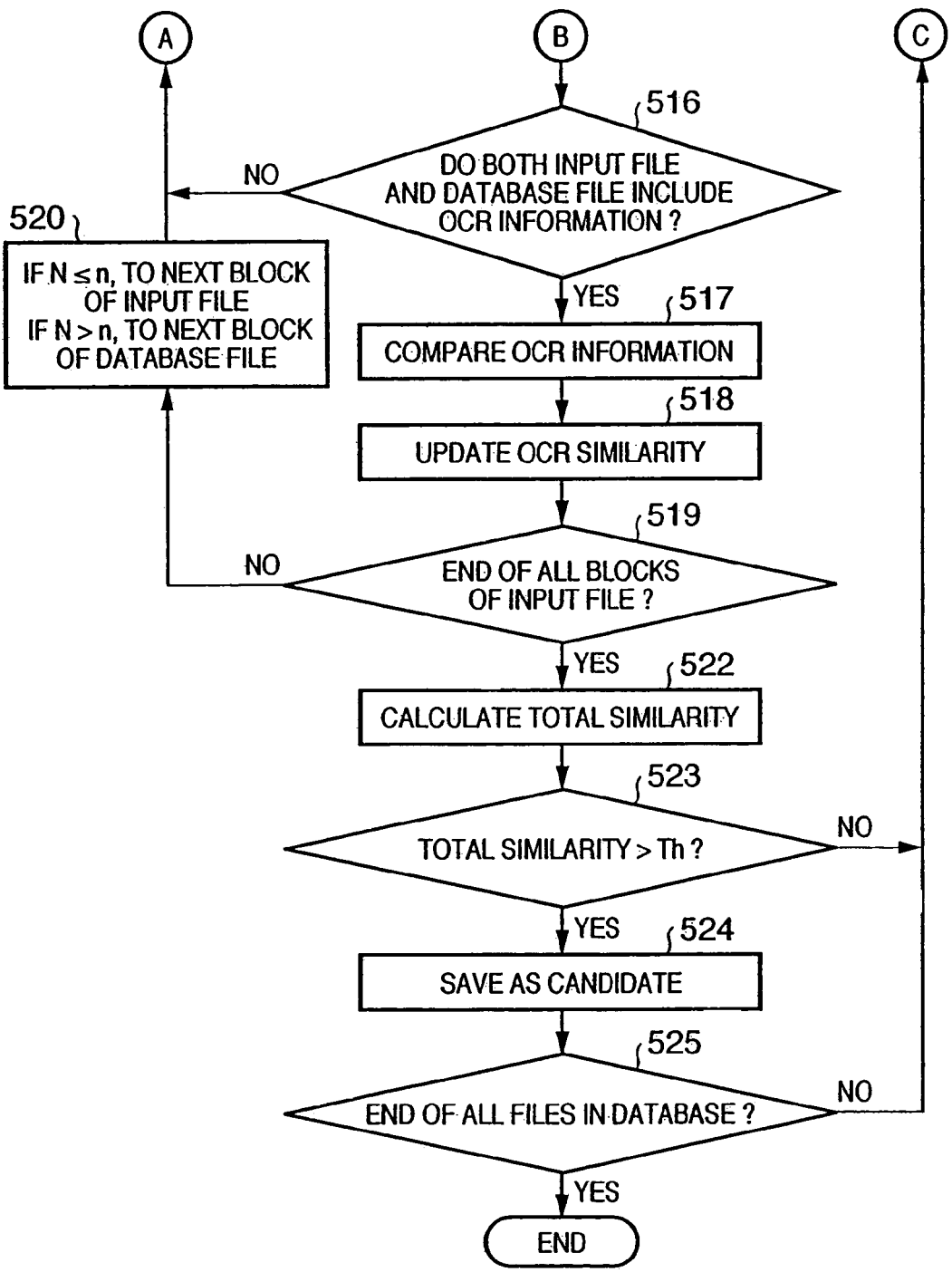

Details of the file search process in step 126 in FIG. 3 will be described below using FIGS. 5, 10A and 10B.

The process in step 126 is done if an input document (input file) has no pointer information in step 124, if pointer information is available but no digital file is found or if a digital file is an image file in step 125, as described above.

Assume that blocks and an input file extracted as a result of step 122 have information (block information, input file information) shown in FIG. 5. As the information contents, a property, coordinate position, width and height, and availability of OCR information are exemplified. The property categorizes each block into one of text, line, photo, picture, table, and the like. For the sake of simplicity, respective blocks are respectively named as blocks 1, 2, 3, 4, 5, and 6 in ascending order of coordinate X (i.e., X1<X2<X3<X4<X5<X6). The total number of blocks indicates that of those included in an input file, and is "6" in FIGS. 10A and 10B. FIGS. 10A and 10B are flow charts of a layout search of files similar to an input file from the database using these pieces of information. Assume that files stored in the database have the same kinds of information (block information, file information) as those in FIG. 5.

In the flow of this flow chart, an input file is compared in turn with those in the database. In step 510, similarity levels and the like (to be described later) are initialized. In step 511, the total numbers of blocks are compared. If Yes in step 511, respective pieces of information of blocks in files are compared in turn. Upon comparing information of blocks, property, size, and OCR similarity levels are calculated in steps 513, 515, and 518, and a total similarity level is calculated based on these levels in step 522. Since a method of calculating each similarity level can use a known technique, a description thereof will be omitted. If it is determined in step 523 that the total similarity level is higher than a pre-set threshold value Th, that file is determined as a similar candidate in step 524. In FIGS. 10A and 10B, N, W, and H are respectively the total number of blocks, the block width, and the block height in an input file, and $\Delta N$, $\Delta W$, and $\Delta H$ are values which consider errors with reference to the block information of the input file. Also, n, w, and h are respectively the total number of blocks, the block width, and the block height in a file stored in the database. Although not shown, position information X, position information Y, and the like may be compared upon comparing sizes in step 514.

As a result of the above search process, database files which have similarity levels higher than the threshold value Th and are saved as candidates (step 524) are displayed as thumbnails or the like (step 127). If a plurality of candidates are displayed, a file is specified from these candidates by the operator's input operation.

<<Vectorization Process>>

The vectorization process in step 129 in FIG. 3 will be described in detail below. In this process, if it is determined that no original digital file is present in the file server, image data (scanned input image data) shown in FIG. 4 is converted into vector data for respective blocks.

<Vectorization of Text Block>

Initially, respective characters in a text block undergo a character recognition process. In the character recognition process, an image extracted for each character is recognized using one of pattern matching methods to obtain a corresponding character code. In this recognition process, an observation feature vector obtained by converting a feature acquired from a character image into a several-dozens-dimensional numerical value string is compared with a dictionary feature vector obtained in advance for each character type, and a character type with a shortest distance is output as a recognition result. Various known methods are available for feature vector extraction. For example, a method of dividing a character into a mesh pattern, and counting character lines in respective meshes as line elements depending on their directions to obtain a (mesh count)-dimensional vector as a feature is known.

When a text region extracted by block selection (step 121) undergoes character recognition, the writing direction (horizontal or vertical) is determined for that region, lines are extracted in the corresponding directions, and character images are then obtained by extracting characters. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region. Upon decomposition into character strings and characters, in case of horizontal writing, lines are extracted using the horizontal projection, and characters are extracted based on the vertical projection for the extracted line. In case of a vertical writing text region, the relationship between the horizontal and vertical parameters may be exchanged. Note that a character size can be detected at that time.

Next, the font type of respective characters in the text block of interest is recognized. A plurality of sets of dictionary feature vectors for the number of character types used in character recognition are prepared in correspondence with character shape types (i.e., font types), and a font type is output together with a character code upon matching, thus recognizing the font of a character.

Using a character code and font information obtained by the character recognition and font recognition, and outline data prepared for each character code and font, information of a character part is converted into vector data. If an original document is a color document, the color of each character is extracted from the color image and is recorded together with vector data.

With the above processes, image information which belongs to a text block can be converted into vector data with a nearly faithful shape, size, and color.

<Vectorization of Line Image Block, Picture Block, Etc.>

Figure 11:
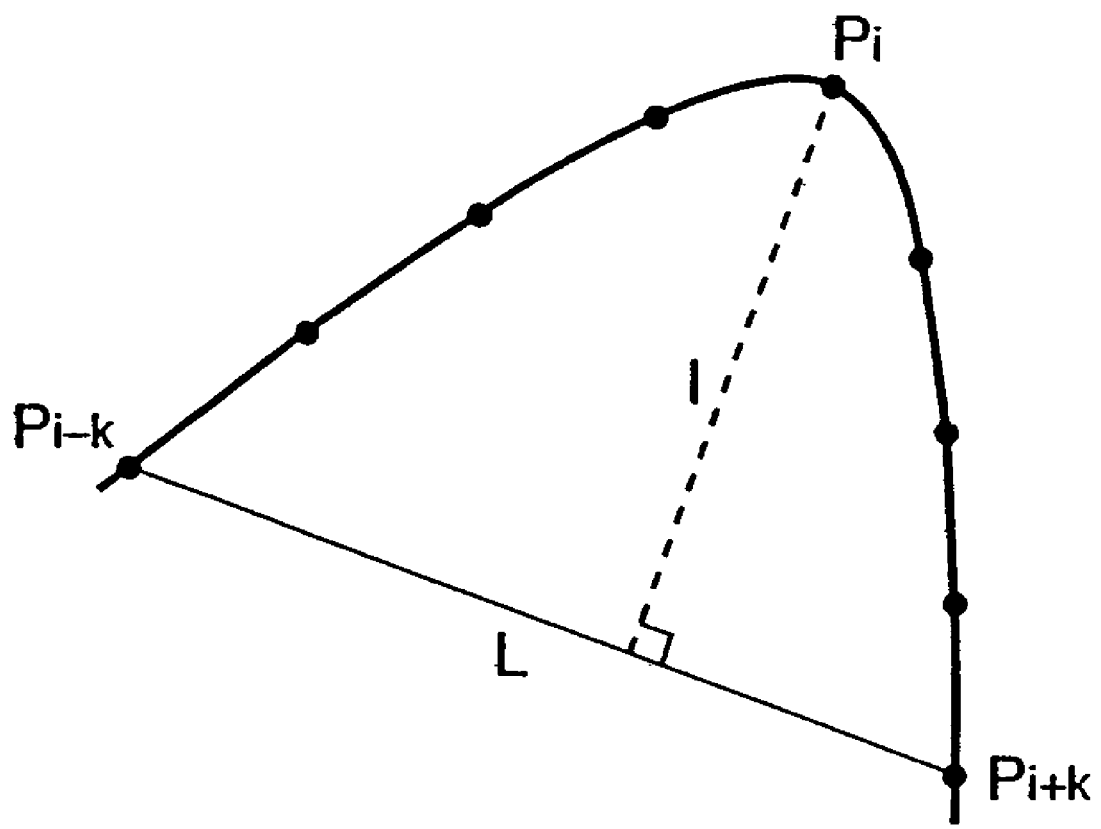
FIG. 11 is an explanatory view of a vectorization process.

For a region which is determined as a line image, picture, or table region by the block selection process (step 121), outlines of pixel clusters extracted in each region of interest are converted into vector data. More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 11. Furthermore, let R be (chord length/arc length between Pi−k and Pi+k). Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted by tracing the outline of white pixels.

As described above, using partial line approximation, an outline of a graphic with an arbitrary shape can be vectorized. When an original document has a color image, the color of a graphic is extracted from the color image and is recorded together with vector data.

Figure 12:
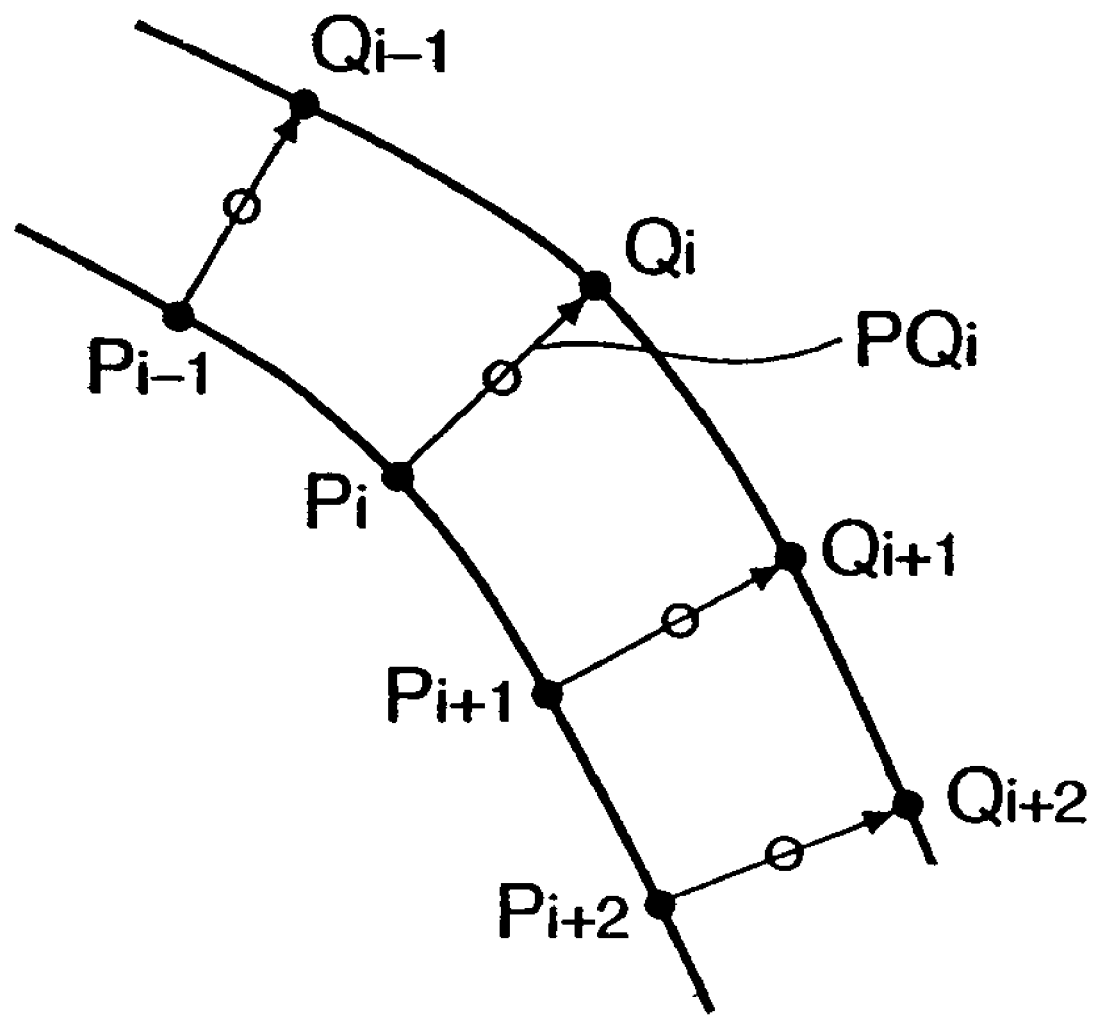
FIG. 12 is an explanatory view of a vectorization process.

Furthermore, when an outside outline is close to an inside outline or another outside in a given section as shown in FIG. 12, the two outlines may be combined to express a line with a given width. More specifically, lines are drawn from respective points Pi on a given outline to points Qi on another outline, each of which has a shortest distance from the corresponding point. When the distances PiQi maintain a constant value or less on the average, the section of interest is approximated by a line or curve using middle points Ri as a point sequence, and the average value of the distances PiQi is set as the width of that line or curve. A line or a table ruled line as a set of lines can be efficiently vectorized as a set of lines having a given width, as described above.

Note that vectorization using the character recognition process for a text block has been explained. A character which has the shortest distance from a dictionary as a result of the character recognition process is used as a recognition result. When this distance is equal to or larger than a predetermined value, the recognition result does not always match an original character, and a wrong character having a similar shape is often recognized. Therefore, in the present invention, such character is handled in the same manner as a general line image, as described above, and is converted into outline data. That is, even a character that causes a recognition error in the conventional character recognition process can be prevented from being vectorized to a wrong character, but can be vectorized based on outline data which is visually faithful to image data.

Note that a photo block cannot be vectorized, and is output as image data in the present invention.

A process for grouping vectorized partial lines for each graphic object after the outline of a graphic with an arbitrary shape is vectorized, as described above, will be further described below.

Figure 13:
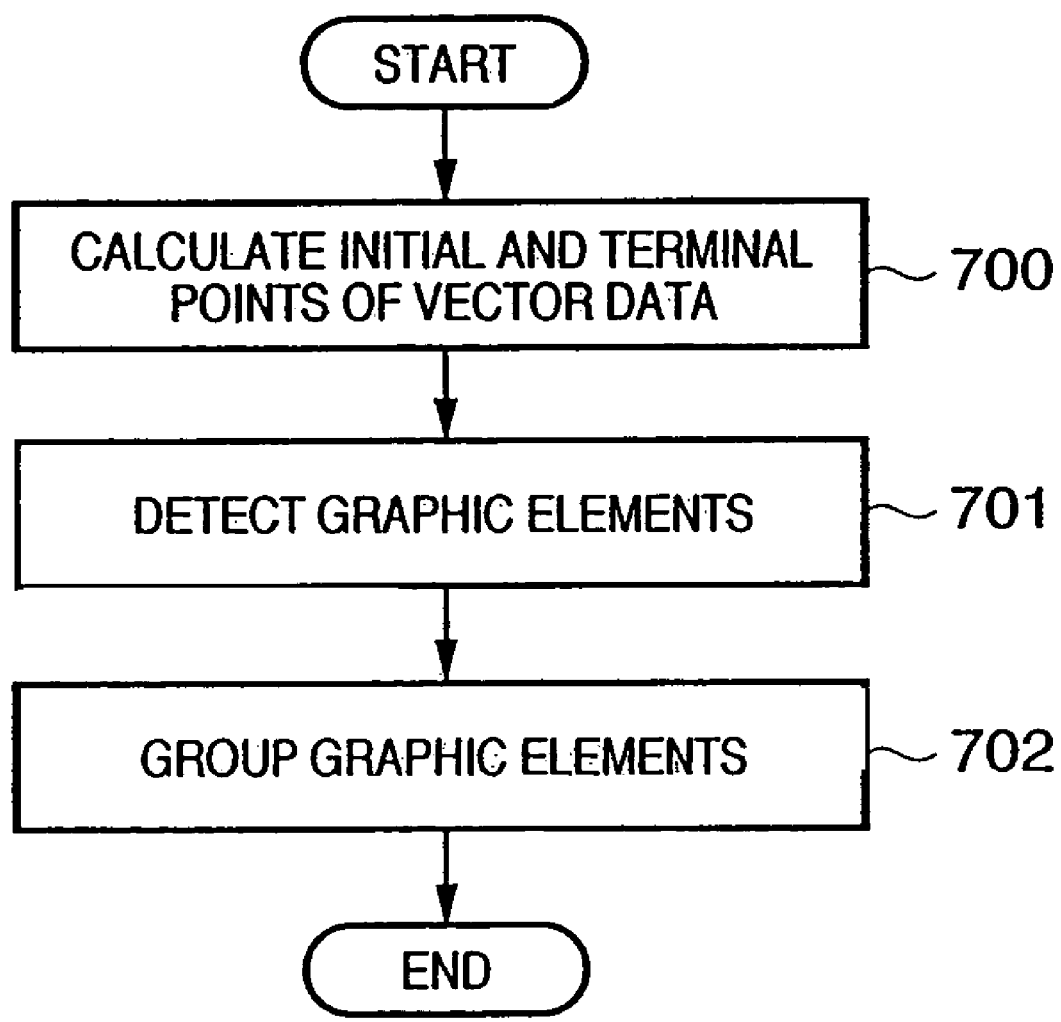
FIG. 13 is a flow chart showing a grouping process of vector data.

FIG. 13 is a flow chart until vector data are grouped for each graphic object. Initial and terminal points of each vector data are calculated (step 700). Using the initial point information and terminal point information of respective vectors, a graphic element is detected (step 701). Detecting a graphic element is to detect a closed graphic formed by partial lines. Such detection is made by applying the principle that each vector which forms a closed shape has vectors coupled to its two ends. Next, other graphic elements or partial lines present in the graphic element are grouped to set a single graphic object (step 702). If other graphic elements or partial lines are not present in the graphic element, that graphic element is set as a graphic object.

Figure 14:
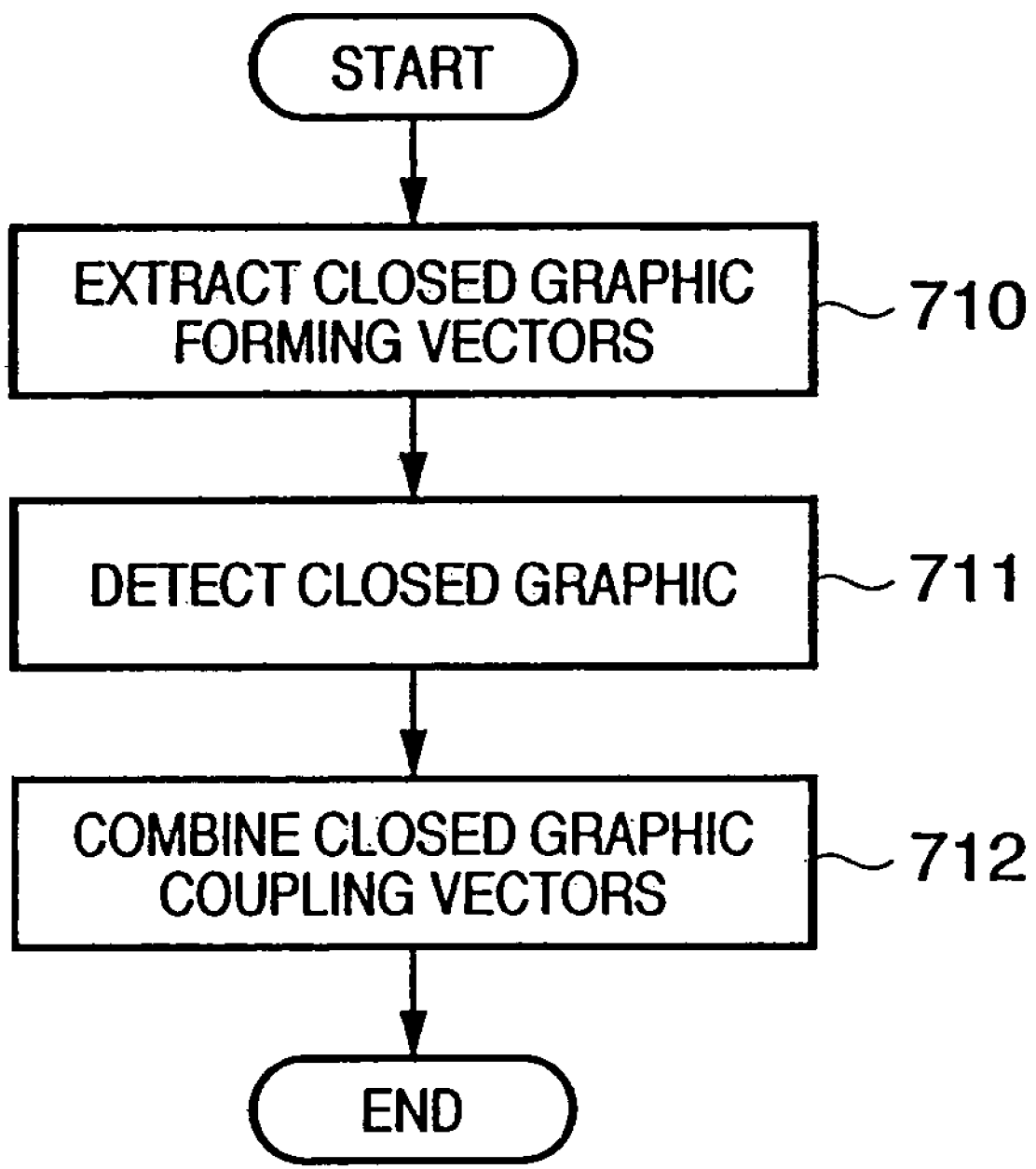
FIG. 14 is a flow chart showing a graphic element detection process.

FIG. 14 is a flow chart showing the process for detecting a graphic element. Closed graphic forming vectors are extracted from vector data by excluding unwanted vectors, two ends of which are not coupled to other vectors (step 710). An initial point of a vector of interest of the closed graphic forming vectors is set as a start point, and vectors are traced clockwise in turn. This process is made until the start point is reached, and all passing vectors are grouped as a closed graphic that forms one graphic element (step 711). Also, all closed graphic forming vectors present in the closed graphic are grouped. Furthermore, an initial point of a vector which is not grouped yet is set as a start point, and the above process is repeated. Finally, of the unwanted vectors excluded in step 710, those which join the vectors grouped as the closed graphic in step 711 are detected and are grouped as one graphic element (step 712).

With the above process, a graphic block can be handled as an independently re-usable graphic object.

<<Conversion Process to Application Data>>

Figure 15:
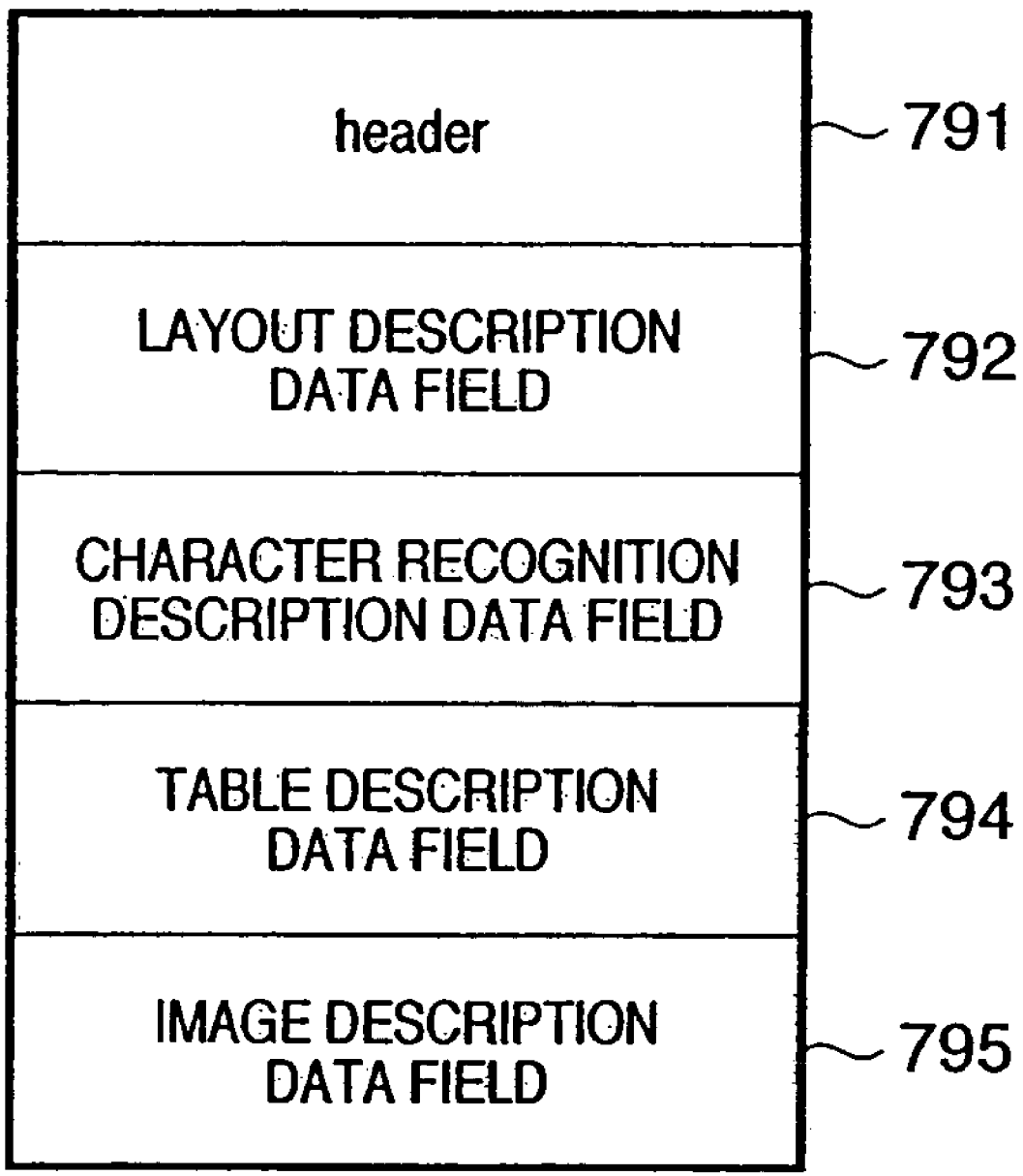
FIG. 15 shows the data structure of a DAOF.

The results after the vectorization process of image data for one page (step 129) are converted into a file of an intermediate data format, as shown in FIG. 15. Such intermediate data format is called a document analysis output format (DAOF).

FIG. 15 shows the data structure of the DAOF. Referring to FIG. 15, reference numeral 791 denotes a Header which holds information associated with document image data to be processed. A layout description data field 792 holds property information and block address information of respective blocks which are recognized for respective properties such as TEXT (text), TITLE (title), CAPTION (caption), LINEART (line image), PICTURE (natural image), FRAME (frame), TABLE (table), and the like. A character recognition description data field 793 holds character recognition results obtained by executing character recognition of TEXT blocks such as TEXT, TITLE, CAPTION, and the like. A table description data field 794 stores details of the structure of TABLE blocks. An image description data field 795 stores image data of PICTURE blocks, LINEART blocks, and the like extracted from the document image data.

Figure 16:
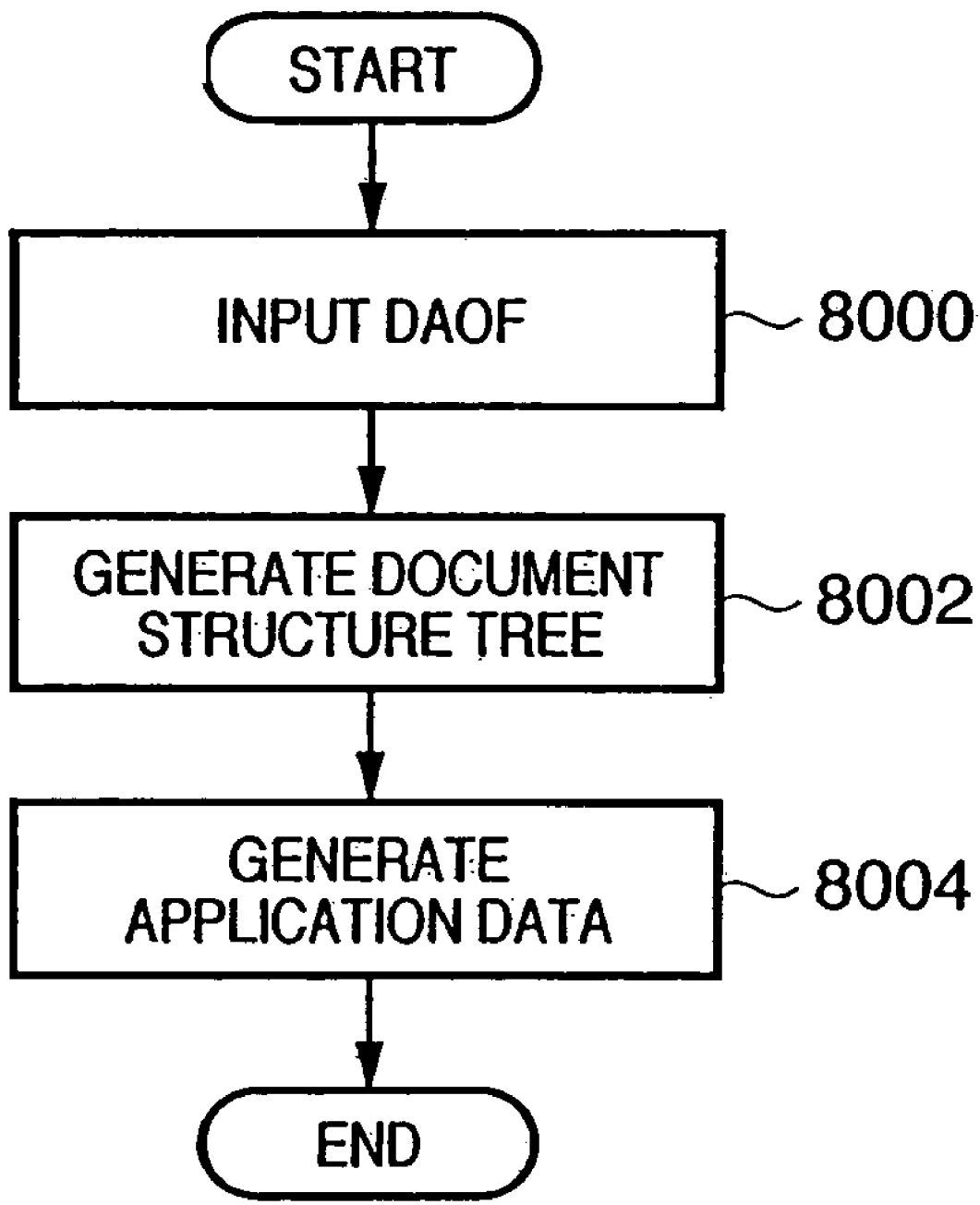
FIG. 16 is a flow chart showing an application data conversion process.

Such DAOF itself is often saved as a file in place of intermediate data. However, in the state of a file, a general document creation application cannot re-use individual objects. Hence, a process for converting the DAOF into application data (step 130) will be described in detail below using FIG. 16.

In step 8000, DAOF data is input.

In step 8002, a document structure tree which serves as a basis of application data is generated.

In step 8004, actual data in the DAOF are input based on the document structure tree, thus generating actual application data.

Figure 17:
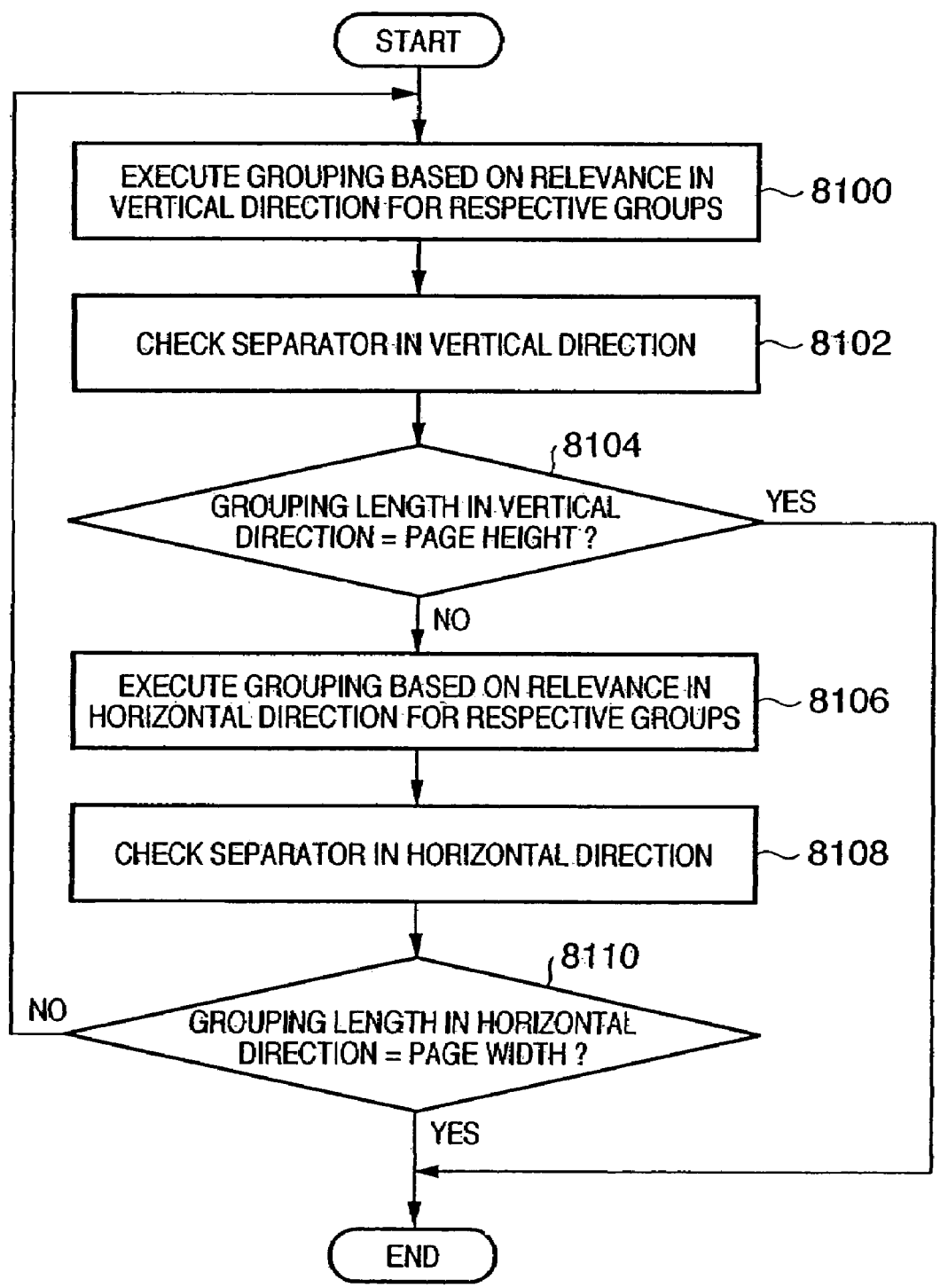
FIG. 17 is a flow chart showing a document structure tree generation process.
Figure 18A:
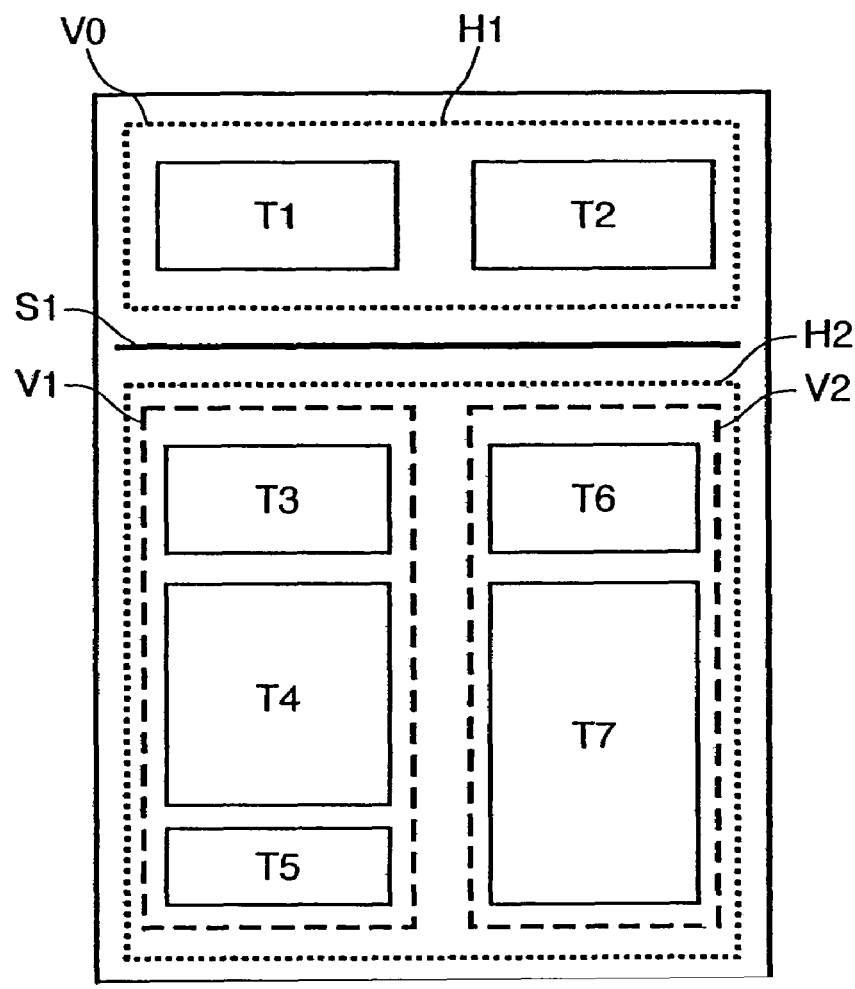
FIGS. 18A and 18B are views for explaining the document structure tree generation process.
Figure 18B:
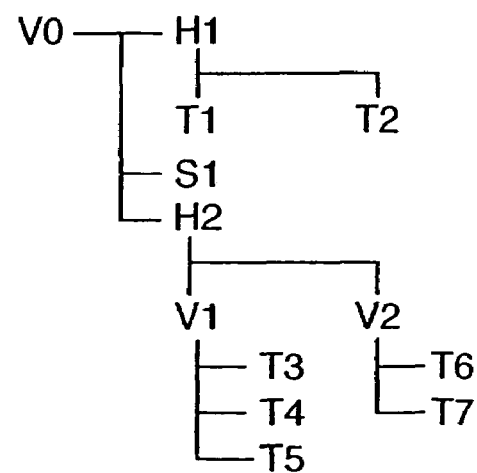

FIG. 17 is a detailed flow chart of the document structure tree generation process in step 8002, and FIGS. 18A and 18B are explanatory view of a document structure tree. As a basic rule of the overall control, the flow of processes transits from a microblock (single block) to a macroblock (a set of blocks). In this case, a block indicates a microblock and macroblock.

In step 8100, re-grouping is done for respective blocks on the basis of relevance in the vertical direction. Immediately after the flow starts, determination is made for respective microblocks. Note that relevance can be defined by checking if the distance between neighboring blocks is small, blocks have nearly the same block widths (heights in case of the horizontal direction), and so forth. Information of the distances, widths, heights, and the like can be extracted with reference to the DAOF.

FIG. 18A shows an actual page configuration, and FIG. 18B shows a document structure tree of that page. As a result of the process in step 8100, T3, T4, and T5 are determined to form one group V1, T6 and T7 are determined to form one group V2, and these groups are generated as those which belong to an identical layer.

In step 8102, the presence/absence of a vertical separator is checked. Physically, a separator is an object which has a line property in the DAOF. Logically, a separator is an element which explicitly divides blocks in an application. Upon detection of a separator, a group is re-divided in the identical layer.

It is then checked in step 8104 using a group length if no more divisions are present. If the group length in the vertical direction agrees with a page height (a distance between the uppermost and lowermost ends of a plurality of blocks present in the page of interest), the document structure tree generation process ends. In case of FIGS. 18A and 18B, groups V1 and V2 have no separator, and their group height does not agree with the page height. Hence, the flow advances to step 8106.

In step 8106, re-grouping is done for respective blocks on the basis of relevance in the horizontal direction. In this process as well, the first determination immediately after the start is done for respective microblocks. The definitions of relevance and its determination information are the same as those in the vertical direction.

In case of FIGS. 18A and 18B, T1 and T2 generate group H1, and V1 and V2 generate group H2. Groups H1 and H2 are generated as those which belong to an identical layer one level higher than V1 and V2.

In step 8108, the presence/absence of a separator in the horizontal direction is checked. Since FIGS. 18A and 18B include separator S1, that separator is registered in a tree, thus generating layers H1, S1, and H2.

It is checked in step 8110 using a group length if no more divisions are present. When the group length in the horizontal direction agrees with a page width, the document structure tree generation process ends.

Otherwise, the flow returns to step 8102 to repeat the processes from relevance check in the vertical direction in an upper layer by one level.

In case of FIGS. 18A and 18B, since the group length agrees with the page width (a distance between the leftmost and rightmost ends of a plurality of blocks present in the page of interest), the process ends, and uppermost layer V0 that represents the entire page is finally appended to the document structure tree.

After the document structure tree is completed, application data is generated based on that information in step 8004. A practical example in case of FIGS. 18A and 18B will be explained below.

That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output.

Since H2 includes two blocks V1 and V2 in the horizontal direction, it is output as two columns. Internal information of V1 is output in the order of T3, T4, and T5, and a new column is set. Then, internal information of V2 is output in the order of T6 and T7.

In this way, since the conversion process into application data can be done in the output order, for example, the converted application data can have a correct read order of text regions and the like.

<<Generation of Portal Sheet>>

A portal sheet 2201 will be explained first with reference to FIG. 19. The portal sheet shown in FIG. 19 records information (information associated with an image input in step 120) of six documents. Information of each document includes the following four pieces of information 2202 to 2205.

Reference numeral 2203 denotes a thumbnail image (thumbnail) of a document, which represents the first page.

Reference numerals 2202 and 2204 denote a plurality of pieces of information associated with the thumbnail 2203, which include a date, title, author, ID, keyboard, abstract, and the like. These pieces of information include those which are appended in advance to the document, are input by the user, or are automatically extracted from the contents of the document.

Reference numeral 2205 denotes a pointer indicating the storage location or the like of the document. In this embodiment, the pointer 2205 is expressed by a two-dimensional barcode. Alternatively, a linear barcode or digital watermark may be used.

Figure 20:
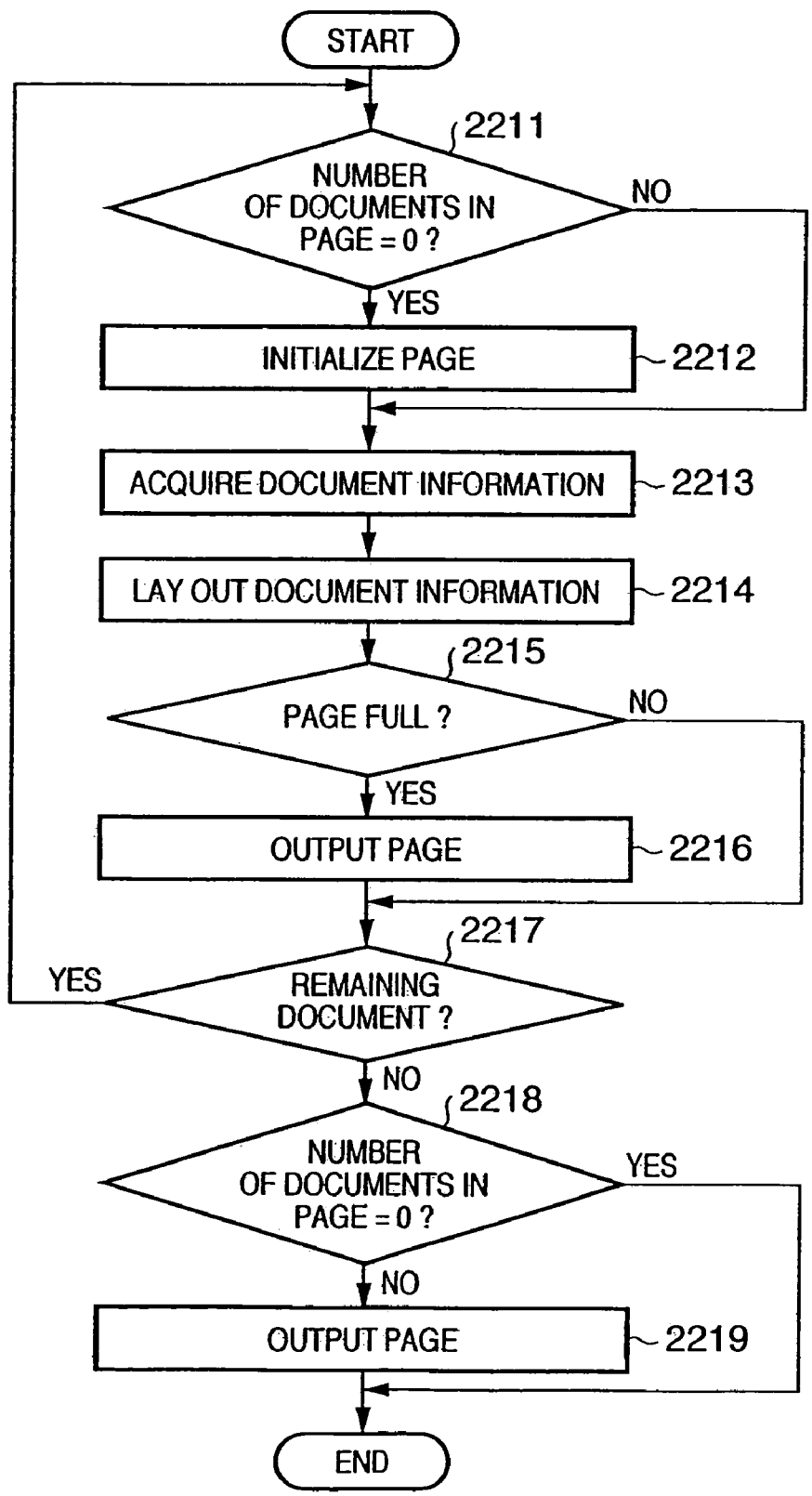
FIG. 20 is a flow chart showing a portal sheet generation process.

A portal sheet generation method corresponding to the process in step 134 in FIG. 3 will be described below using FIG. 20.

The operator selects a portal sheet output mode from a control panel (not shown) in advance, and inputs the number of cases (the number of documents per page) to be displayed per sheet using a ten-key pad of the control panel. In this example, assume that "6" is set.

It is confirmed in step 2211 if a document is laid out in a page of a portal sheet. Since no document is laid out initially, an initialization process of the portal sheet page is executed in step 2212.

Figure 19:
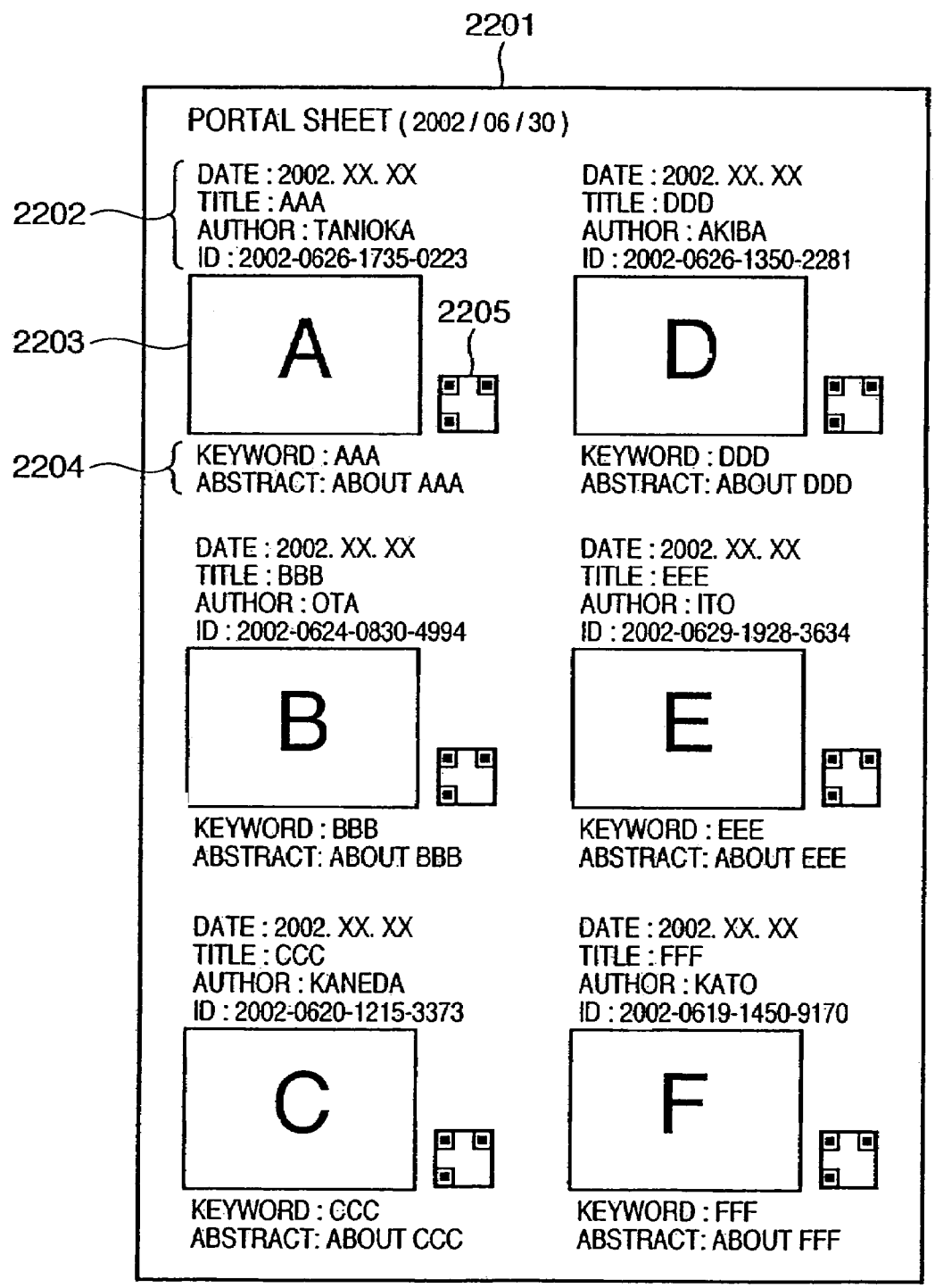
FIG. 19 shows an example of a portal sheet.

A set of document information which includes a date, title, and the like of each document is acquired (2213), and the acquired information is laid out on the portal sheet page (2214), as shown in FIG. 19. In step 2214, pointer information of each document is appended.

It is confirmed if the number of documents laid out in the portal sheet page reaches the number of documents per page designated by the operator (2215). If Yes in step 2215, the current page is output to the printer.

Finally, it is confirmed if all documents have been laid out (2217). If a document to be laid out is found, the flow returns to step 2211; otherwise, the last page is output as needed (2218, 2219), thus ending the process.

A method of generating a set of document information (title, keywords, ID, date, author, abstract, table of contents, and the like) which is acquired in step 2213 and is laid out in step 2214 will be explained below.

As a method of extracting a title from text data contained in a document, for example, a sentence which appears at the start of the text data, has a large font size, and has a high frequency of use in the text data is extracted as a title using the layout information and font information extracted by the aforementioned method.

As a method of extracting keywords from text data contained in a document, for example, the entire text data is decomposed into words by, among others, morphological analysis. All words are sorted in accordance with their frequencies of use, and are selected as keywords in descending order of frequency of use. In order to extract more effective keywords, words may be compared with a keyword database, which is prepared in advance.

As for information of an ID, date, and author, if a file is found by a digital file search process, such information is acquired as property information of that file.

As for abstract information, the following method of generating an abstract of text data formed of a character code sequence may be used. Text data is decomposed into sentences or clauses. In this case, the text data can be automatically divided into sentences or clauses using character codes of punctuation marks as boundaries. Next, an importance level is calculated for each sentence or clause. As a method of calculating the importance level, a method of calculating the frequencies of occurrence of words contained in the entire text data, giving a high score to a word that appears frequently, and calculating the importance level of each sentence or clause as a sum total of the scores of words included in that sentence or clause, a method of calculating the importance level by detecting a sentence corresponding to a title or headline using layout information and font information to increase the importance level of that sentence, or to increase the scores of words included in that sentence, and the like may be used. Finally, an abstract is generated by extracting sentences or clauses with higher importance levels. By changing the number of importance levels to be extracted, an abstract with a desired size can be generated.

As for generation of table of contents information, for example, when a table of contents is to be generated for text data for a plurality of pages, text is divided into paragraphs based on spaces on a layout, and these paragraphs undergo an abstract generation process to assign abstract sentences each for about one line. Especially, sentences which are extracted as a title or headlines based on the layout information and font information are best suited to a table of contents.

A pointer information appending process for appending pointer information (e.g., 2205 in FIG. 19) to indicate the storage location of a document will be explained below. Assume that this pointer information appending process is executed upon laying out document information in step 2214.

Figure 21:
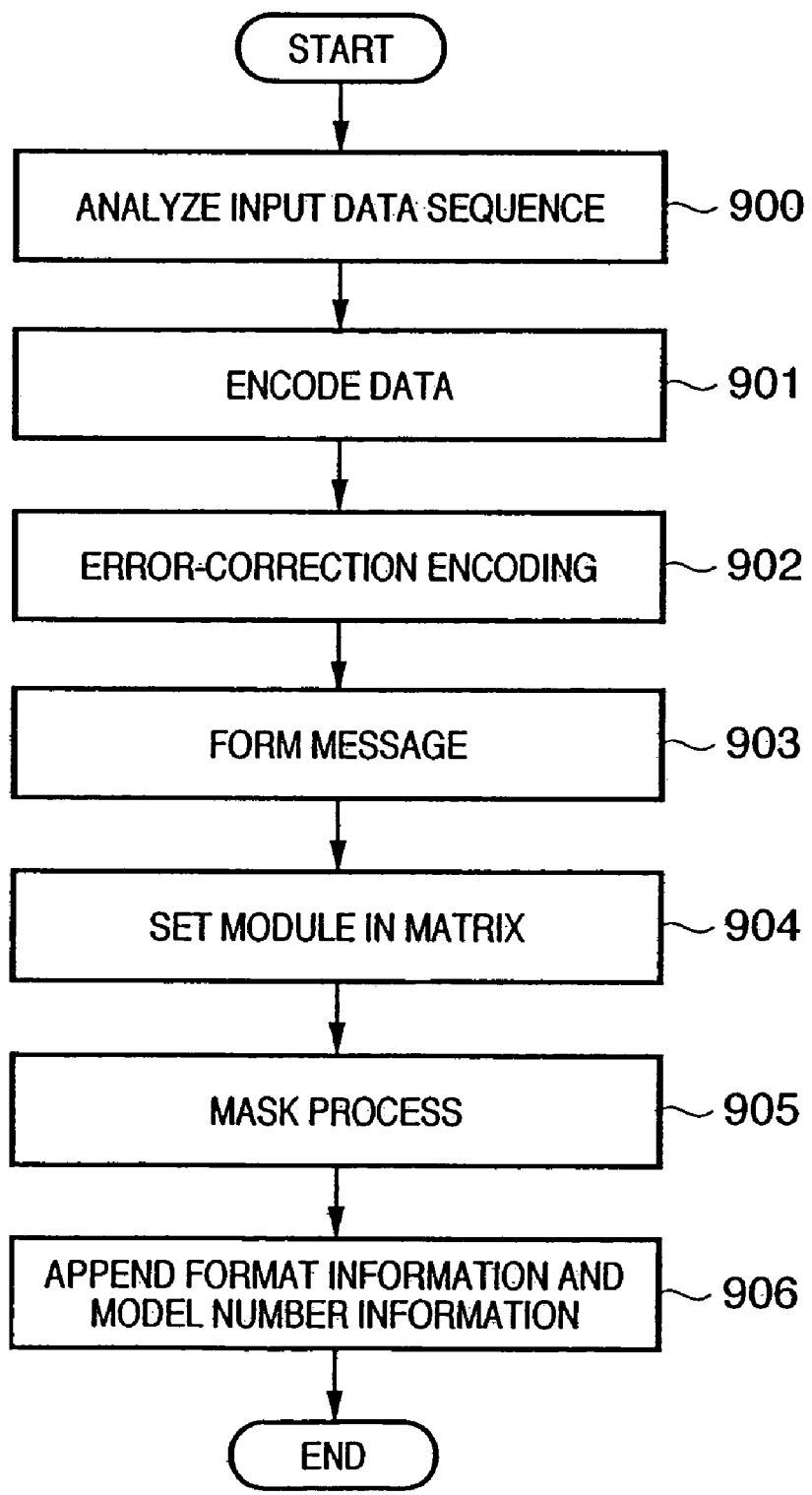
FIG. 21 is a flow chart showing a pointer information encoding process.

FIG. 21 is a flow chart showing the sequence for encoding a data character string as pointer information by a two-dimensional barcode (QR code symbol: JIS X0510).

Data to be encoded in the two-dimensional barcode represents address information of the corresponding file, which is formed of, for example, path information including a file server name and file name. Or the address information may be formed of a URL to the corresponding file, a file ID managed in the database 105 that stores the corresponding file or in a storage device of the MFP 100 itself, or the like.

In order to identify different types of characters to be encoded, an input data sequence is analyzed. Also, error detection and error correction levels are selected, and a minimum model number that can store input data is selected (step 900).

The input data sequence is converted into a predetermined bit sequence, and an indicator indicating a mode (numeric, alphanumeric, 8 bit byte, kanji, etc.) and an end pattern are appended as needed. Furthermore, the bit sequence is converted into predetermined bit code words (step 901).

At this time, for the purpose of error correction, the code word sequence is segmented into a predetermined number of blocks in accordance with the model number and error correction level, and error correction code words are generated for respective blocks and are appended after the data code word sequence (step 902).

The data code words of respective blocks obtained in step 902 are connected, and error correction code words and remainder code words as needed are connected after the data code word sequence (step 903).

Next, the code word module is set in a matrix together with a position detection pattern, separation pattern, timing pattern, alignment pattern, and the like (step 904).

Furthermore, a mask pattern optimal to the symbol encoding region is selected, and is converted by calculating XORs with the module obtained in step 904 (step 905).

Finally, type information and model number information are generated for the module obtained in step 905, thus completing a two-dimensional code symbol (step 906).

The aforementioned two-dimensional barcode that incorporates address information is appended upon laying out document information in step 2214. For example, when a portal sheet is generated from the client PC 102, the two-dimensional barcode may be converted into recordable raster data by the data processing device 115, and may be appended to a predetermined position on raster data upon image formation.

As means for appending additional information, a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied in addition to the two-dimensional barcode described in this embodiment.

An example of embedding code information in a halftone image (thumbnail image) placed on the portal sheet using a digital watermark will be explained below.

Code information is embedded as a binary data sequence by weighting one bit per pixel of each color component on an image. Upon embedding code information in pixels, one code information is embedded in one block formed of neighboring pixels. The code information is repetitively embedded in a plurality of blocks which do not overlap each other. A block formed by a plurality of blocks embedded with identical code information will be referred to as a macroblock hereinafter. Note that the entire thumbnail image can be expressed by a macroblock. Upon extracting embedded code information, cross-correlation values for respective blocks are calculated from the macroblock, and code information can be extracted based on the statistical amount of these cross-correlation values.

Code information can be sufficiently embedded in an image by changing pixels to the level at which it is imperceptible to a human being. However, the image quality of a thumbnail image used on the portal sheet is not so important. Hence, robust information can be embedded using larger weights.

<<Edit Process of Portal Sheet>>

The portal sheet prepared as described above will be explained below.

A desired edit process of a portal sheet required to access a designated page, a designated paragraph, a designated image, the designated page of a designated document, the designated paragraph of the designated page of the designated document, the designated image of the designated page of the designated document, and the like using the scanned portal sheet will be explained below using FIGS. 22 and 23. Note that an embodiment to be described below is a fundamental form, and can be arbitrarily modified. The edit process of a portal sheet obtained by scanning the portal sheet will be explained. Alternatively, the portal sheet prepared as described above may be directly held as digital data, and the held portal sheet may be edited.

Figure 22:
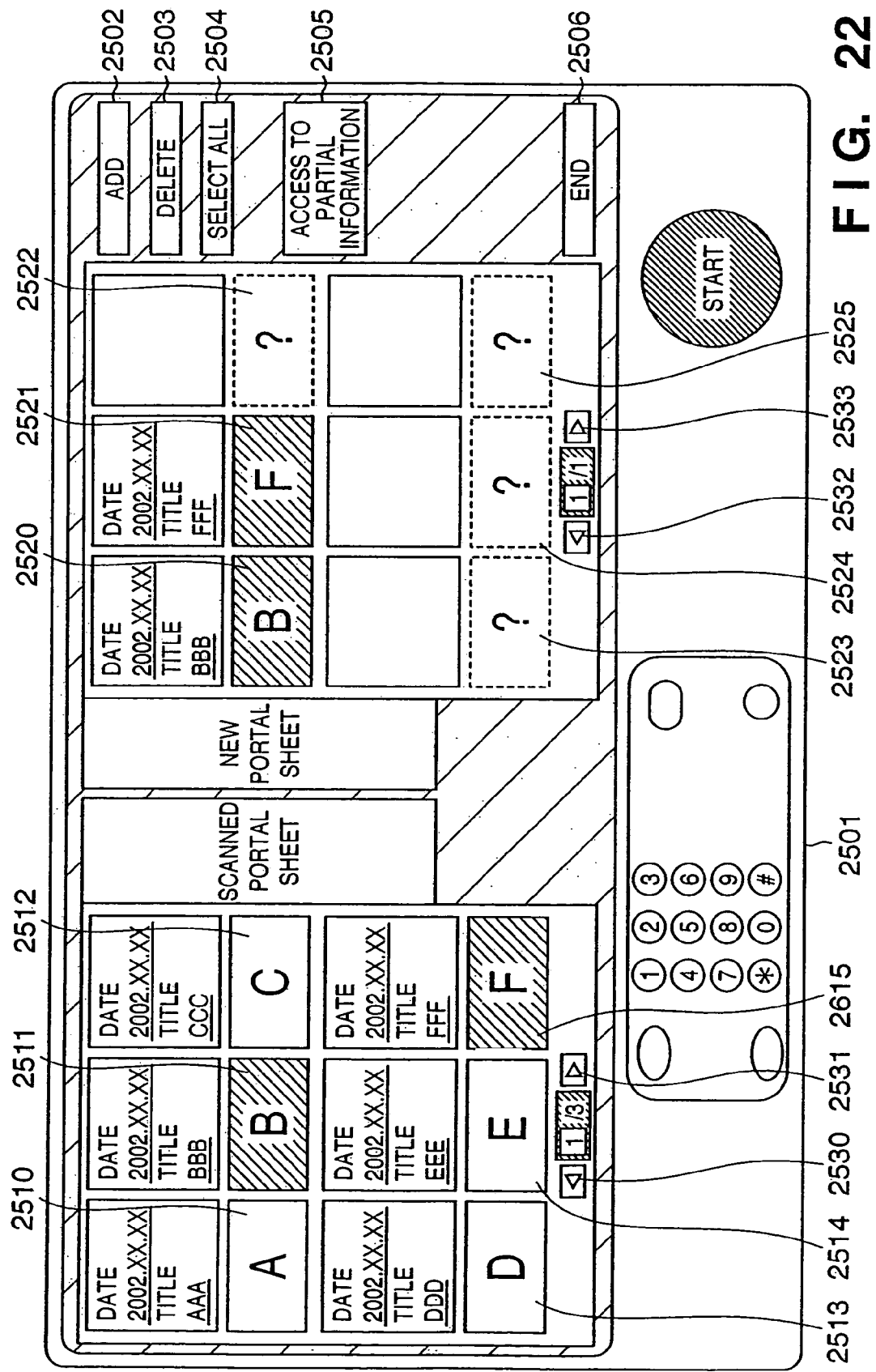
FIG. 22 shows a portal sheet edit window.

FIG. 22 is a schematic view of a user interface (to be abbreviated as UI hereinafter) 2501 of the MFP or the like. As described above, since information of a thumbnail, title, date, abstract, keywords, pointer information, and the like can be obtained from a digital watermark or the like by scanning the portal sheet, they are displayed on the UI, and the user edits a desired new portal sheet by observing such information.

Respective parts displayed on the UI will be described below.

Reference numerals 2502 to 2506 denote buttons which are used to edit the portal sheet using the displayed thumbnail, and respectively have functions of "add", "delete", "select all", "access to partial information", "end", and the like in the order named. Reference numerals 2530 and 2531 denotes buttons which have functions of "back to previous page" and "go to next page" used when a plurality of portal sheets are scanned. Reference numerals 2510 to 2515 denote fields that display information each including a thumbnail, title, date, and the like obtained after the portal sheet is scanned. Reference numerals 2520 to 2525 denote information fields on an edited portal sheet (to be referred to as a new portal sheet hereinafter).

The edit operation of the portal sheet in FIG. 22 will be described below. The user touches a desired thumbnail on the left area of the window with a finger or pen to activate that thumbnail, and then presses the add button 2502, thus adding the thumbnail to the right area of the window (new portal sheet window). By pressing the select all button 2504, all thumbnails displayed on the left area of the window can be activated. A thumbnail to be deleted from the new portal sheet can be deleted by pressing the delete button 2503. When the user wants to display the next scanned portal sheet on the left area of the window, he or she presses the page change button 2530 or 2531. Upon completion of the desired edit operation, the user quits the operation by pressing the "end" button 2506. FIG. 22 shows the result obtained after the user selects (activates) the thumbnails 2511 and 2515 and then presses the add button. Note that the portal sheet can be edited by drag & drop operations in place of the operations using the buttons. More specifically, the user drags a desired thumbnail on the scanned portal sheet window while touching it, and drops (releases) that thumbnail at a desired add position on the new portal sheet window, thus adding that thumbnail. When another thumbnail has already been registered at the add position where the user dropped the thumbnail, the already registered thumbnails are shifted in turn to their next positions, and the dropped thumbnail is added to that add position. When the user touches a desired portal sheet on the new portal sheet window, and drags and drops that sheet at a position outside the new portal sheet window, he or she can delete the portal sheet from the new portal sheet. Also, the user can change the order of thumbnails registered on the new portal sheet by drag & drop operations. For example, when the user drags thumbnail F and drops it at the position 2520 on the new portal sheet window, thumbnail B is displayed at the position 2521 since its registration order is shifted, and thumbnail F is displayed at the position 2520.

Although not shown, information such as a title and the like can also be edited. The edit result on the right area of the window inherits inner information (pointer information to an original image using a digital watermark or the like) of the portal sheet on the left area of the window, and is generated as a new portal sheet. In this way, a new portal sheet that collects only necessary information can be generated.

Figure 23:
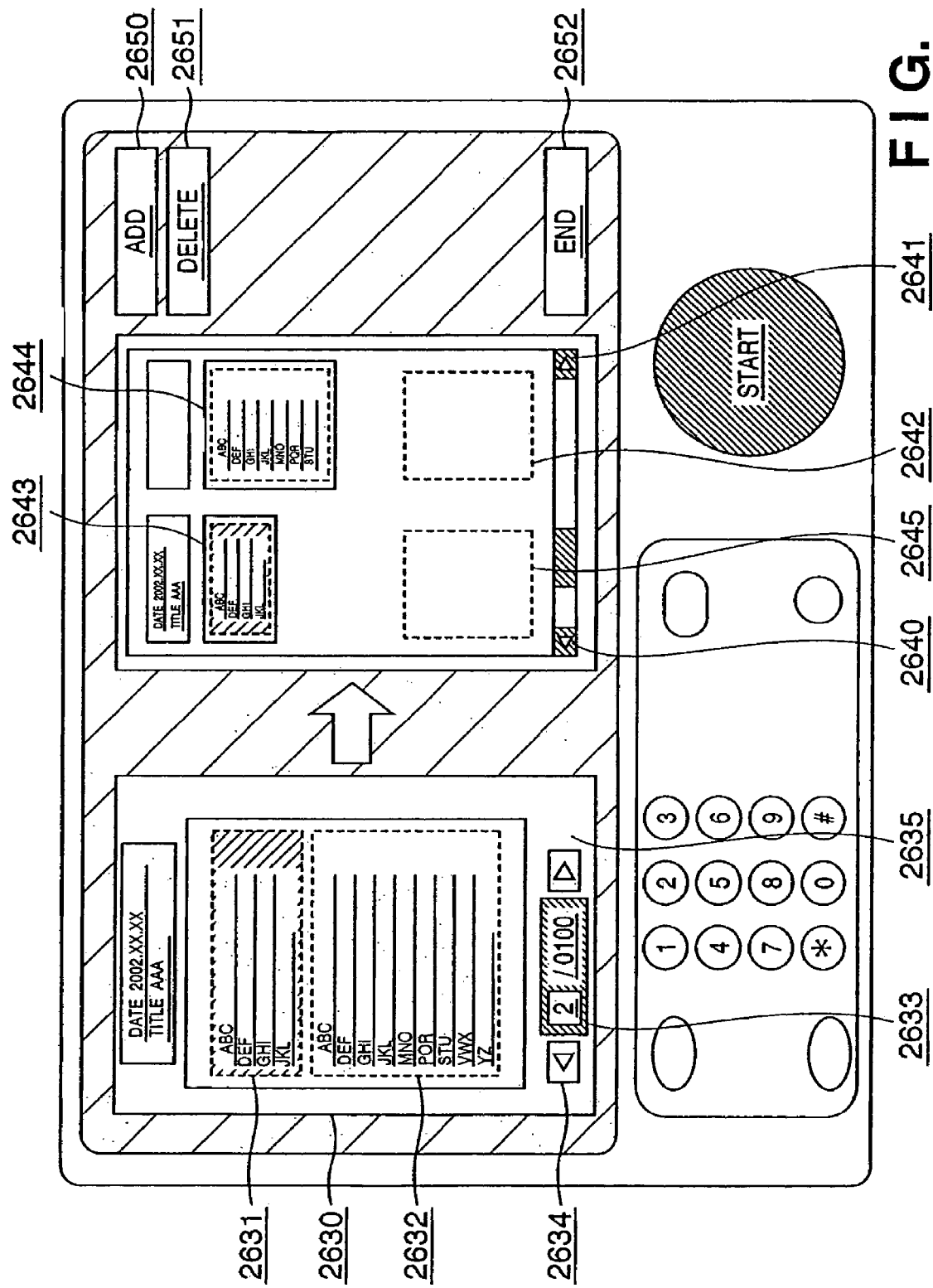
FIG. 23 shows a portal sheet edit window upon accessing partial information.

FIG. 23 shows a UI window displayed upon selection of the "access to partial information" button (2505) in FIG. 22. A left area 2630 of the window displays original digital data (data for each document page) on the basis of the pointer information of a thumbnail selected from the portal sheet in FIG. 22. This original digital data is segmented into regions based on properties such as a title, body text, illustration, and the like, and objects for respective segmented regions are identifiably displayed (2631, 2632). FIG. 23 provides the UI window that allows the user to add these objects to the portal sheet shown in FIG. 22.

Reference numeral 2633 denotes a field that displays the page number of the currently displayed thumbnail, and another page can be selected using buttons 2634 and 2635. Reference numerals 2643 to 2646 denote fields used to display objects selected from the original digital data displayed on the left area. The displayed objects can be scrolled using buttons 2640 and 2641. Object add/delete functions and an edit end function are implemented using buttons 2650 to 2652. Also, drag & drop edit operations (add, delete, order change, and the like of objects) can be made in the same manner as in FIG. 22.

The process for displaying information obtained by scanning a portal sheet on the UI as thumbnails, as shown in FIG. 22, and generating a new portal sheet using partial information (designated page, designated paragraph, designated image, and the like) of documents displayed as thumbnails will be described in detail below. The user selects one, partial information of which he or she wants to access, of thumbnails (2510 to 2515) obtained by scanning the portal sheet, and selects the "access to partial information" button (2505). Then, the UI window shown in FIG. 23 is displayed, and original digital data of the selected thumbnail is displayed on the area 2630. The area 2630 allows the user to recognize regions segmented for respective vectorized objects (paragraph, image, and the like) at a glance. When the user touches and selects partial information that he or she wants to access (use), and presses the "add" button, the partial information (object) to be selected can be added to the right area of the window. When the user wants to access a designated page, he or she can turn the page using the buttons 2634 and 2635. Also, the added partial information can be deleted by the "delete" button. Upon depression of the "end" button, access to partial information ends, and the UI shown in FIG. 22 is displayed again. Then, a plurality of pieces of partial information (objects displayed on the right area of the window in FIG. 23) selected on FIG. 23 are added in turn to the new portal sheet (fields 2520 to 2525) in FIG. 22. In this way, using the "access to partial information" button, the user can add each partial information (designated page, designated paragraph, designated image, or the like) to the new portal sheet, i.e., he or she can use only required information on the portal sheet.

<<Use of Portal Sheet>>

The user can easily select a page or object to be browsed, transmitted, or printed using the portal sheet which is prepared or edited, as described above. For example, when a portal sheet is scanned, the scanned portal sheet is displayed, as shown on the left side of FIG. 22. When the user selects a page (or object) to be processed from that portal sheet, selects a desired processing mode, and then presses a "START" button, original digital data is acquired based on pointer information of the selected page (or object), and undergoes a desired process (browse, transmission, or print process).

OTHER EMBODIMENTS

<Another Embodiment Associated with File Access Right>

Figure 9:
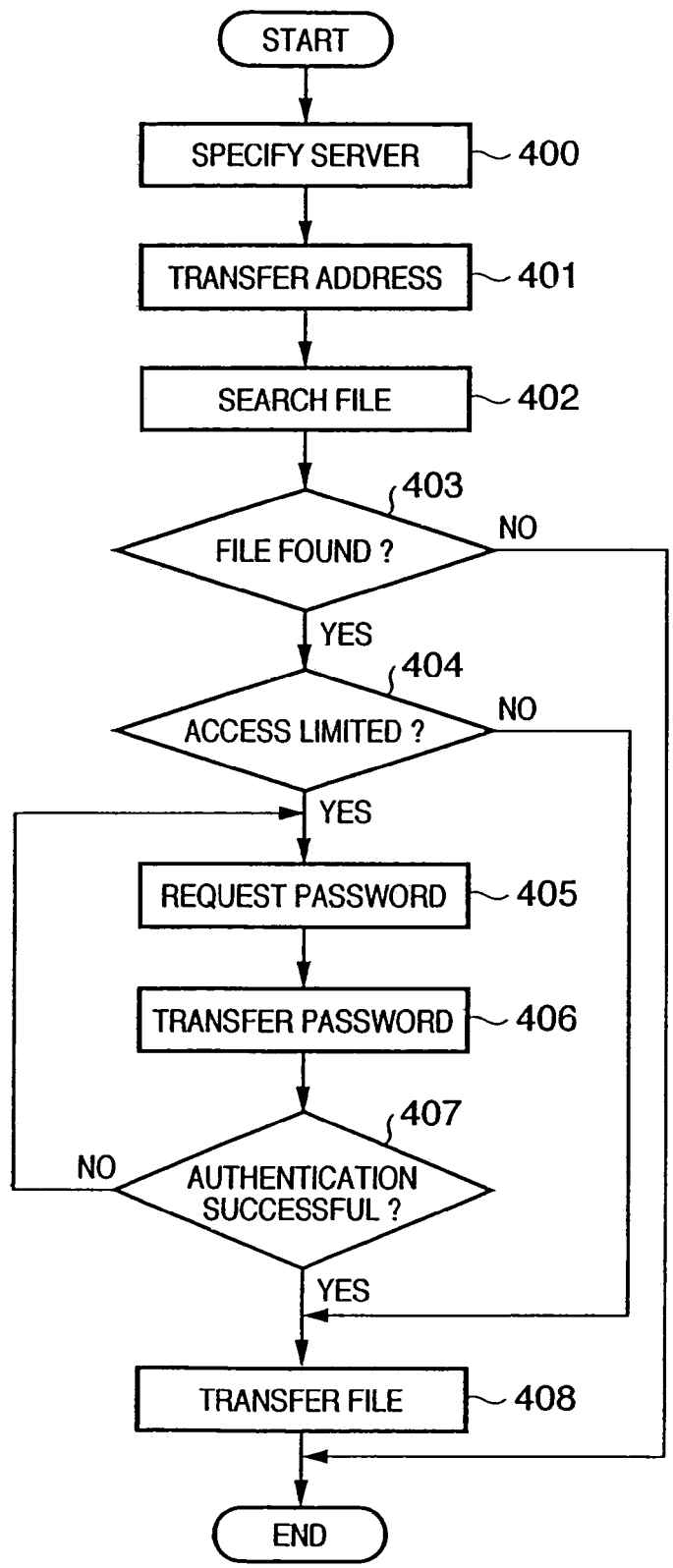
FIG. 9 is a flow chart showing an access-limited file search process.

Re-use of some of our document files by a third party must often be limited. The above embodiment has been explained under the condition that all files stored in the file server can be freely accessed, and the entire file or some objects of the file are re-usable. Hence, another embodiment associated with a case wherein when a file is searched for using pointer information in the above embodiment, the access right of a file that can be specified as a result of the search is limited will be described below using FIG. 9. Since steps 400 to 403 are the same as those in the above embodiment, a description thereof will be omitted. If a file is specified in step 403, the file server checks access right information of that file in step 404. If the access right of that file is limited, the file server requests the MFP to transmit a password (step 405).

The MFP prompts the operator to input a password, and transmits the input password to the file server (step 406).

The file server collates the received password to make authentication (step 407). If authentication has succeeded, the server notifies the file address (step 134), as has been explained using FIG. 3, and transfers a file to the MFP if the process that the user wants is acquisition of image file data (step 408).

Note that the authentication method for access right control is not limited to the method using the password in steps 405 and 406. For example, various other authentication means such as popular biological authentication (e.g., fingerprint authentication), authentication using a card, and the like can be adopted.

In this embodiment, a file is specified by pointer information additionally given to a paper document. The same control can be applied to a case wherein a file is specified by the search process in steps 126 to 128 in FIG. 3.

Also, the vectorization process explained in steps 129 in FIG. 3 can be limited. That is, when a limitation of the access right to a given paper document is detected based on a watermark or the like from image information obtained by scanning that paper document, the vectorization process is executed only when authentication is successful, thus limiting use of documents with high secrecy.

<Another Embodiment Associated with File Specification>

In the above embodiment, means for specifying original file data from image information obtained by scanning a document specifies a document based on pointer information appended to the document or searches for a corresponding digital file on the basis of each object information described in the document, as has been described using FIG. 3. In order to specify an original file more accurately, a digital file that meets both of these means can be specified. That is, even when the presence of an original file can be detected based on pointer information obtained from a document, a layout search according to layout information or a full-text search based on a keyword obtained by character recognition is also conducted for the detected file using object information in the document, and a file that can yield a high matching rate is formally specified as an original file. For example, even when the lower-bit part of pointer information is doubtful and cannot be corrected by error correction, a file can be specified by narrowing down the search range. Therefore, a file can be quickly and accurately specified.

<Another Embodiment of Vectorization>

In the above embodiment, when search means cannot specify an original file, the entire document image undergoes a vectorization process. For example, in case of a general document, not all objects in the document are newly created, and some objects may be diverted from other files. For example, a document creation application prepares some patterns of background objects (wallpapers), and the user normally selects and uses one of these patterns. Hence, such object is more likely to be present in other document files in the document file database as re-usable vector data.

Hence, as another embodiment of the vectorization process in step 129 in FIG. 3, the database is searched for a file which includes an object which substantially matches each of individual objects segmented by the block selection process, and vector data of the matched object is individually acquired from that file. As a result, since vectorization of the whole document need not be done, it can be done more quickly, and deterioration of image quality due to vectorization can be prevented.

On the other hand, in FIG. 3, when an original file can be specified as a PDF in the search process in steps 126 to 128, that PDF often has, as an additional file, character codes obtained by already applying character recognition to text objects in that document. Upon vectorizing such PDF file, if the character code file is used, a character recognition process in the vectorization process in step 129 and subsequent steps can be skipped. That is, the vectorization process can be done more quickly.

In the above embodiment, each text block is converted into vector data on the basis of character codes and font data obtained as the character recognition result of that text block. Alternatively, as in the vectorization process of line image blocks and picture blocks, outlines of character images may be extracted and may be converted into vector data.

<Another Embodiment of Object Used to Form Portal Sheet>

In the above embodiment, as a document to be controlled is converted into a portal sheet for respective pages of document images. However, the present invention is not limited to this, and a portal sheet may be generated for respective pages of a plurality of documents, or may be generated for respective documents by displaying their cover pages or the like as thumbnails. Also, a portal sheet may include both information for respective documents and pages.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

As described above, according to the present invention, since a portal sheet of an input image is generated, digital data stored in storage means can be easily re-used using that portal sheet.

Since pointer information used to specify original digital data is appended, it is easy to search for the original digital data.

Since the portal sheet can be edited for respective objects (blocks), only required objects can be handled, and a process such as a browse process or the like can be easily selected.

Since vector data are stored, the required storage capacity can be reduced. If original digital data is found, that original digital data is used, thus minimizing deterioration of image quality.

The present invention is not limited to the above embodiments and various changes and modification can be made within the spirit and scope of the present inventions. Therefore, to apprise the public of the scope of the present invention, the following claims are made.

What is claimed is:

1. An image processing method comprising:
    a search step of searching storage means for original digital data corresponding to each input image;
    a vectorization step of converting the input image into vector data when no original digital data is found in the search step;
    a storage step of storing the image that has been converted into the vector data in the vectorization step in the storage means as digital data; and
    a sheet generation step of generating a sheet including at least one of information associated with the found original digital data when the original digital data is found in the search step and information associated with digital data which is obtained by converting the image into the vector data in the vectorization step and is stored in the storage step when no original digital data is found in the search step.

2. The method according to claim 1, wherein the information associated with the original digital data or the information associated with the digital data stored in the storage step, which is included in the sheet generated in the sheet generation step, includes a plurality of storage address information relating to a plurality of input images, wherein the storage address information relating to the input image for which original digital data has been found in the search step is a storage address of the found original digital data, and wherein the storage address information relating to the input image for which no original digital data has been found in the search step is a storage address of the digital data stored in the storage step.

3. The method according to claim 2, wherein the information associated with the storage address is described using at least one of a digital watermark and a barcode.

4. The method according to claim 1, wherein the search step includes a step of recognizing an identifier which is appended to the input image and indicates a storage address of the original digital data, and searching for the original digital data on the basis of the recognition result of the identifier.

5. The method according to claim 1, wherein the vectorization step includes a step of executing vectorization on the basis of a character recognition result of a text block included in the image.

6. The method according to claim 1, wherein the vectorization step includes a step of executing vectorization by generating outline data based on outlines of significant pixels.

7. The method according to claim 1, further comprising a format conversion step of converting the image that has been converted into the vector data in the vectorization step into a prescribed format which is accessible by an existing document processing application.

8. The method according to claim 1, wherein the vectorization step includes a step of converting each of objects included in the image into vector data.

9. The method according to claim 1, wherein the information associated with the original digital data or the information associated with the digital data stored in the storage step, which is included in the sheet generated in the sheet generation step, further includes at least one of a thumbnail image, title, abstract, keyword, ID, date, and author of digital data.

10. The method according to claim 1, further comprising an edit step of editing the information to be laid out on the generated sheet.

11. The method according to claim 10, wherein the edit step includes a step of editing and generating a new sheet by selecting desired data from the information associated with the original digital data or the information associated with the digital data stored in the storage step, which is included in the sheet.

12. The method according to claim 10, wherein the edit step includes a step of selecting desired data from the information associated with the original digital data or the information associated with the digital data stored in the storage step, which is included in the sheet, and selecting desired partial information in the selected data, so as to edit the sheet using the selected partial information.

13. The method according to claim 1, further comprising a processing step of displaying an image obtained by scanning the generated sheet, and executing a process on the basis of information associated with digital data selected by the user from the displayed image.

14. The method according to claim 13, wherein the processing step includes a step of executing a desired process for original digital data or digital data corresponding to information selected by the user.

15. An image processing system comprising:
   search means for searching storage means for original digital data corresponding to each input image;
   vectorization means for converting the input image into vector data when no original digital data is found by said search means;
   save means for storing the image that has been converted into the vector data by said vectorization means in the storage means as digital data; and
   sheet generation means for generating a sheet including at least one of information associated with the found original digital data when the original digital data is found by said search means and information associated with digital data which is obtained by converting the image into the vector data by said vectorization means and is stored by said save means when no original digital data is found by said search means.

16. A computer readable storage medium storing a computer program, the computer program making a computer execute;
   a search step of searching storage means for original digital data corresponding to each input image;
   a vectorization step of converting the input image into vector data when no original digital data is found in the search step;
   a storage step of storing the image that has been converted into the vector data in the vectorization step in the storage means as digital data; and
   a sheet generation step of generating a sheet including at least one of information associated with the found original digital data when the original digital data is found in the search step and information associated with digital data which is obtained by converting the image into the vector data in the vectorization step and is stored in the storage step when no original digital data is found in the search step.

* * * * *